United States Patent
Chanclon et al.

(10) Patent No.: US 11,364,682 B2
(45) Date of Patent: *Jun. 21, 2022

(54) BUILD MATERIAL CONTAINER

(71) Applicant: HEWLETT-PACKARD DEVELOPMENT COMPANY, L.P., Spring, TX (US)

(72) Inventors: Ismael Chanclon, Sant Cugat del Valles (ES); Xavier Alonso, Sant Cugat del Valles (ES); Ferran Esquius, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/822,395

(22) Filed: Mar. 18, 2020

(65) Prior Publication Data

US 2020/0215753 A1    Jul. 9, 2020

Related U.S. Application Data

(63) Continuation of application No. 16/069,075, filed as application No. PCT/EP2016/060790 on May 12, 2016.

(51) Int. Cl.
| | |
|---|---|
| *B29C 64/255* | (2017.01) |
| *B33Y 40/00* | (2020.01) |
| *B29C 64/307* | (2017.01) |
| *B29C 64/20* | (2017.01) |
| *B29C 31/02* | (2006.01) |
| *B33Y 30/00* | (2015.01) |
| *B29C 64/357* | (2017.01) |

(Continued)

(52) U.S. Cl.
CPC ............ *B29C 64/255* (2017.08); *B22F 12/00* (2021.01); *B29C 31/02* (2013.01); *B29C 64/20* (2017.08); *B29C 64/307* (2017.08); *B29C 64/357* (2017.08); *B33Y 30/00* (2014.12); *B33Y 40/00* (2014.12); *B22F 10/10* (2021.01); *Y02P 10/25* (2015.11)

(58) Field of Classification Search
CPC ....... B29C 64/255; B33Y 30/00; B33Y 40/00; B22F 3/1055; B22F 2003/1056; B22F 2003/1059
See application file for complete search history.

(56) References Cited

U.S. PATENT DOCUMENTS

| | | | | |
|---|---|---|---|---|
| 3,275,197 A | * | 9/1966 | Eklund | B65G 65/36 |
| | | | | 406/91 |
| 4,499,669 A | * | 2/1985 | Haeck | B65G 65/365 |
| | | | | 34/102 |

(Continued)

FOREIGN PATENT DOCUMENTS

| | | |
|---|---|---|
| CN | 2918329 | 7/2007 |
| CN | 101495294 | 7/2007 |

(Continued)

OTHER PUBLICATIONS

"Z®810 Color 3D Printer User Manual"; Sep. 2004.

*Primary Examiner* — Jeremy Carroll
(74) *Attorney, Agent, or Firm* — HP Inc. Patent Department

(57) ABSTRACT

An additive manufacturing build material container comprises a reservoir to hold build material and a build material outlet structure.

20 Claims, 13 Drawing Sheets

(51) Int. Cl.
*B22F 12/00* (2021.01)
*B22F 10/10* (2021.01)

(56) References Cited

U.S. PATENT DOCUMENTS

| | | | |
|---|---|---|---|
| 6,930,791 | B2 | 8/2005 | Jackelen |
| 7,282,687 | B2 | 10/2007 | Matsuda et al. |
| 7,311,474 | B1 * | 12/2007 | Ogasahara ............. B65G 53/14 |
| | | | 406/143 |
| 7,900,146 | B2 | 3/2011 | Kozuka et al. |
| 7,971,991 | B2 | 7/2011 | Davidson et al. |
| 8,027,044 | B2 | 9/2011 | Sato et al. |
| 2002/0118382 | A1 | 8/2002 | Jackelen |
| 2003/0054067 | A1 | 3/2003 | Ho |
| 2006/0108254 | A1 * | 5/2006 | Gomoll ............. B65D 21/0234 |
| | | | 206/509 |
| 2008/0006334 | A1 | 1/2008 | Davidson et al. |
| 2008/0187423 | A1 | 8/2008 | Mauchle et al. |
| 2008/0241404 | A1 * | 10/2008 | Allaman ............... B29C 64/165 |
| | | | 427/333 |
| 2008/0265482 | A1 | 10/2008 | Morales |
| 2009/0242619 | A1 * | 10/2009 | Blomberg ............. B65D 90/046 |
| | | | 229/108 |
| 2010/0199287 | A1 | 8/2010 | Boda et al. |
| 2011/0188063 | A1 | 8/2011 | Nuggehalli et al. |
| 2011/0220707 | A1 * | 9/2011 | Solimini ............. B65D 77/065 |
| | | | 229/117.35 |
| 2012/0107438 | A1 * | 5/2012 | Bokodi ............... B01F 7/00158 |
| | | | 425/200 |
| 2013/0164960 | A1 | 6/2013 | Swanson |
| 2019/0061251 | A1 * | 2/2019 | Chanclon ............... B29C 31/02 |
| 2019/0225400 | A1 * | 7/2019 | Weyrauch .......... B65D 77/0466 |

FOREIGN PATENT DOCUMENTS

| | | |
|---|---|---|
| CN | 102083714 | 6/2011 |
| CN | 201949844 | 8/2011 |
| CN | 202609624 | 12/2012 |
| CN | 204019803 | 12/2014 |
| CN | 104842563 | 8/2015 |
| GB | 1302830 | 1/1973 |
| JP | 2002-205791 | 7/2002 |
| JP | 2006312309 | 11/2006 |
| JP | 2009062089 | 3/2009 |
| JP | 2009062089 A | 3/2009 |
| JP | 2009538226 | 11/2009 |
| WO | WO-9534468 A1 | 12/1995 |
| WO | WO-2007139938 A2 | 12/2007 |
| WO | WO-2012012630 A1 | 1/2012 |
| WO | WO-2016046543 | 3/2016 |

* cited by examiner

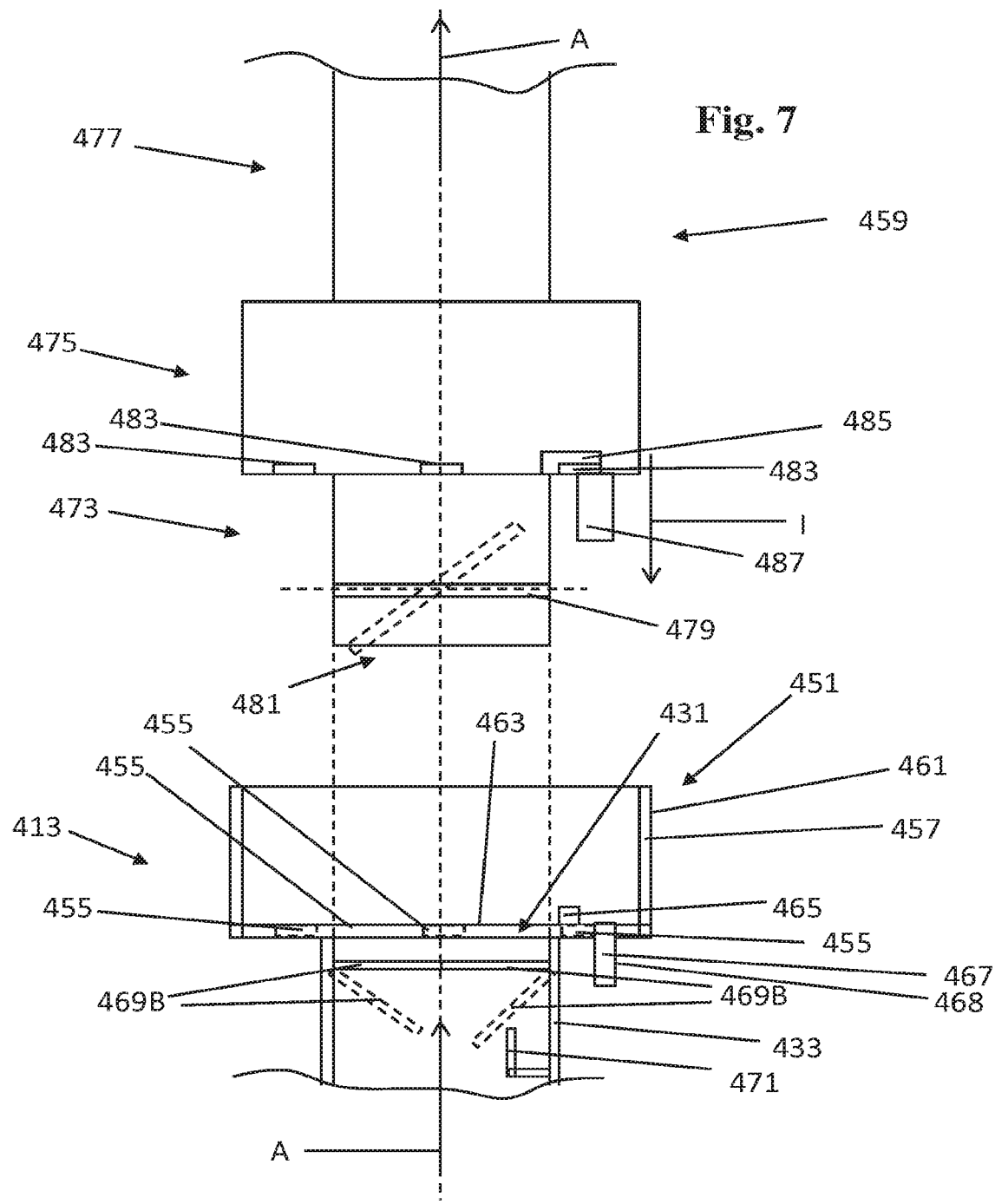

BUILD MATERIAL CONTAINER

BACKGROUND

Additive manufacturing techniques such as three-dimensional (3D) printing, relate to techniques for making 3D objects of almost any shape from a digital 3D model through additive processes, in which 3D objects are generated on a layer-by-layer basis under computer control. A large variety of additive manufacturing technologies have been developed, differing in build materials, deposition techniques and processes by which the 3D object is formed from the build material. Such techniques may range from applying ultraviolet light to photopolymer resin, to melting semi-crystalline thermoplastic materials in powder form, to electron-beam melting of metal powders.

Additive manufacturing processes usually begin with a digital representation of a 3D object to be manufactured. This digital representation is virtually sliced into layers by computer software or may be provided in pre-sliced format. Each layer represents a cross-section of the desired object, and is sent to an additive manufacturing apparatus, that in some instances is known as a 3D printer, where it is built upon a previously built layer. This process is repeated until the object is completed, thereby building the object layer-by-layer. While some available technologies directly print material, others use a recoating process to form additional layers that can then be selectively solidified in order to create the new cross-section of the object.

The build material from which the object is manufactured may vary depending on the manufacturing technique and may comprise powder material, paste material, slurry material or liquid material. The build material is usually provided in a source container from where the build material needs to be transferred to the building area or building compartment of the additive manufacturing apparatus where the actual manufacturing takes place.

DRAWINGS

FIG. 7 illustrates a diagrammatic front view of an example of an vacuum tube that is to be connected to the outlet structure of FIGS. 6 and 8;

FIG. 8 illustrates a diagrammatic front view of the example outlet structure of FIG. 6 in front view.

DESCRIPTION

Figure 1:
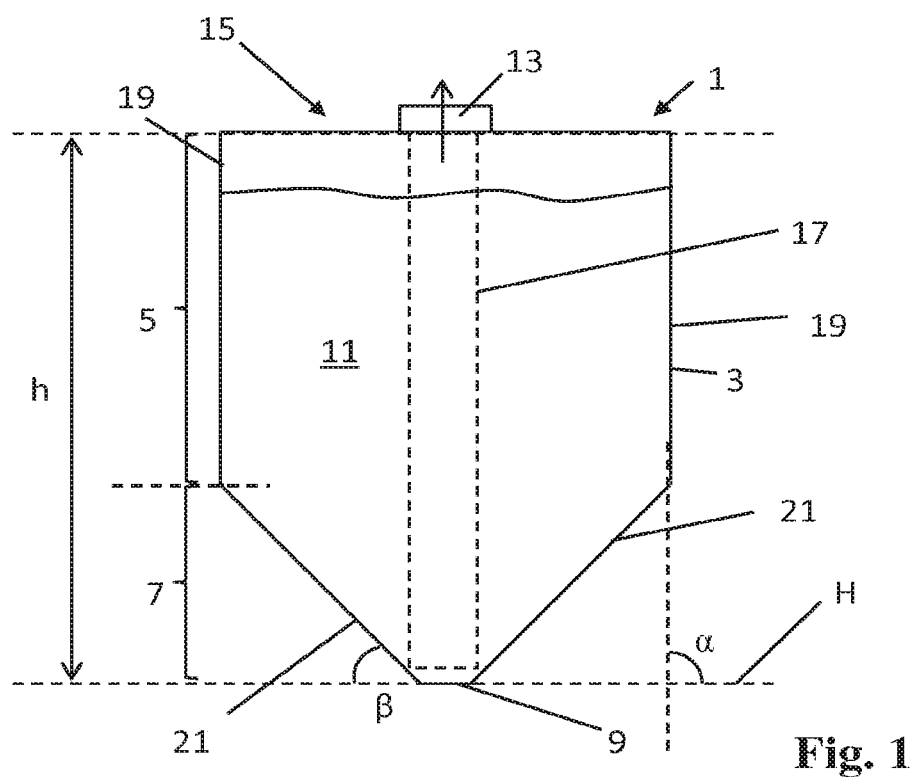
FIG. 1 illustrates a diagram of an example of a container of build material.

Three-dimensional objects can be generated using additive manufacturing techniques. The objects may be generated by solidifying portions of successive layers of build material. The build material can be powder-based and the material properties of generated objects may be dependent on the type of build material and the type of solidification. In some examples, solidification of the powder material is enabled using a liquid fusing agent. Solidification may be further enabled by temporary application of energy to the build material. In certain examples, fuse and/or bind agents are applied to build material, wherein a fuse agent is a material that, when a suitable amount of energy is applied to a combination of build material and fuse agent, causes the build material to fuse and solidify. In other examples, other build materials and other methods of solidification may be used. In certain examples, the build material includes paste material, slurry material or liquid material. This disclosure describes examples of build material containers for adding build material to the additive manufacturing process.

In one example the build material in the container of this disclosure is powder that has an average volume-based cross sectional particle diameter size of between approximately 5 and approximately 400 microns, between approximately 10 and approximately 200 microns approximately, between approximately 15 and approximately 120 microns or between approximately 20 and approximately 70 microns. Other examples of suitable, average volume-based particle diameter ranges include approximately 5 to approximately 70, or approximately 5 to approximately 35 microns. In this disclosure a volume-based particle size is the size of a sphere that has the same volume as the powder particle. With "average" it is intended to explain that most of the volume-based particle sizes in the container are of the mentioned size or size range but that the container may also contain relatively small amounts of particles of diameters outside of the mentioned range. For example, the particle sizes may be chosen to facilitate distributing build material layers having thicknesses of between approximately 10 and approximately 500 microns, or between approximately 10 and approximately 200 microns, or between approximately 15 and approximately 150 microns. One example of an additive manufacturing apparatus may be pre-set to distribute build material layers of approximately 80 microns using build material containers that contain powder having average volume-based particle diameters of between approximately 40 and approximately 60 micron. For example the additive manufacturing apparatus can be reset to distribute different layer thicknesses.

Suitable powder-based build materials for additive manufacturing include polymers, crystalline plastics, semi-crystalline plastics, polyethylene (PE), polylactic acid (PLA), acrylonitrile butadiene styrene (ABS), amorphous plastics, Polyvinyl Alcohol Plastic (PVA), Polyamide (e.g., nylon), thermo(setting) plastics, resins, transparent powders, colored powders, metal powder, ceramics powder such as for example glass particles, and/or a combination of at least two of these or other materials wherein such combination may include different particles each of different materials or different materials in a single compound particle. Examples of blended build materials include alumide, which may include a blend of aluminum and polyamide, multi-color powder, and plastics/ceramics blends. There exist more build materials and blends of build materials that can be contained by a container of this disclosure and that are not mentioned in this disclosure.

A particular batch of build material used in an additive manufacturing process may be "virgin" build material or recycled build material. Virgin build material may be described as build material which has not been used in any part of an additive manufacturing process, and/or has not passed through any part of a 3D printing system, since it has been manufactured by a build material manufacturer. A previously unopened supply of build material may contain virgin build material. By contrast, used or recycled build material can be described as build material that has previously been provided to a build material stage (e.g. part of a powder bed) during additive manufacturing, but that has not been fused. At least some of such previously supplied, but unfused, build material may be suitable for reuse in a subsequent additive manufacturing process. Hence, such build material can be described as used or recycled build material.

In this disclosure, an additive manufacturing apparatus can be a host device for an additive manufacturing process, such as a 3D printer or a build material recycler. An example of a component of an additive manufacturing system is a build material stage. The build material stage supports build material during fusing, e.g. by dispensing fuse agent onto the layers of build material. In one example, the build material stage concerns a separately movable component to be connected to an additive manufacturing apparatus such as the 3D printer or recycler.

The additive manufacturing apparatus or component (e.g., printer, recycler or stage) may include a build material collection system to collect build material from a build material container. However, the build material collection system may also be a separate sub-system, separate from any of these additive manufacturing apparatuses.

In one example, an additive manufacturing system uses powder as build material. Relatively small-sized powder particles (e.g. powder dust) may escape from the system. These particles may tend to float in the air. Hence, operators may need to cover airways and/or eyes during additive manufacturing.

In certain examples of this disclosure, containers are discussed that aim to provide build material to the additive manufacturing apparatuses while maintaining amounts of escaping powder dust, for example when connecting or disconnecting the container to or from the additive manufacturing apparatus. The build material container may be a source container from where build material is added to the additive manufacturing system. The source container can contain virgin or used (recycled) build material.

FIG. 1 illustrates a diagrammatic front view of an example of a container 1 for supplying build material 11 to an additive manufacturing process. In one example, a container 1 is a replaceable source container 1 that is to be connected to a collection system of an additive manufacturing apparatus or a separate build material collection system in order to collect most or all of the build material from the container 1. The container 1 can be disconnected from the additive manufacturing apparatus after exhaustion, to be replaced by another, similar container with build material.

Some example containers of this disclosure may be to facilitate efficient removal of build material contained within those containers. Some such example containers may, e.g., comprise features to ensure that most or all of the build material can be removed from a container. At the same time, the containers may comprise features to ensure that the containers can be easily stacked, stored, transported, disposed of and/or refilled.

The container 1 is illustrated in an upright orientation, e.g., an orientation wherein the container is to be connected to a collection system and the build material is intended to sack to a gravitational lower point in the container. In one example the build material is powder, for example of a type and/or particle size as described above. The container 1 includes a reservoir 3 for holding the build material 11. The build material is contained by walls of the reservoir 3. The container 1 further includes an outlet structure 13 including an opening to allow build material to pass out of the reservoir 3, or where needed, into the reservoir 3. In the example illustrated in FIG. 1 the outlet structure 13 is provided in or near a top side 15 of the container 1. The outlet structure 13 is adapted to cooperate with a corresponding collection system that is to collect build material from the container 1. In a first usage of the container 1, the container 1 may contain virgin build material.

The reservoir 3 also includes a funneled, lower portion having at least one converging side wall 21. The reservoir 3 includes an upper portion 5 of at least one non-converging side wall 19, above the funnel 7. In one example, the upper and lower portion 5, 7 are part of a single, substantially monolithic, reservoir wall structure. In the upright orientation, the non-converging side walls extend upwards from the funnel 7, along most of the height h. In different examples, the upper portion 5 can have one rounded non-converging wall or four straight walls that form a rectangle with straight or rounded corners. In this example we will discuss the rectangular version having four non-converging side walls 19.

In an example, the non-converging upper walls 19 vary from vertical, in said upright orientation of the container 1, for example because of manufacturing tolerances, mold release angles, thermal curing of the reservoir, or other reasons. For example the non-converging walls may have an angle $\alpha$ of between approximately 85 and 95 degrees from a horizontal H, or of a slightly bulging undulated (outwards or inwards) shape. In one example, the angle $\alpha$ with respect to the horizontal H of the relatively non-converging side walls 19 should be closer to a straight angle than an angle $\beta$ of the converging side walls 21 of the funnel 7 with respect to the horizontal H.

In one example an approximate angle $\beta$ with the horizontal of the converging side walls 21 of the funnel 7 can be between approximately 10 and approximately 70 degrees, or between 20 and approximately 60 degrees. The non-converging side walls 19 could converge somewhat but not as much as the converging walls 21 of the funneled portion. In one example a width of the container 1 at the top of the funnel 7 or bottom of the upper portion 5, is approximately the same as a width of the container 1 at the top of the upper portion 5. The non-converging upper portion 5 may allow for efficient build material storage while the funnel 7 may allow for efficient build material retrieval.

Figure 2A:
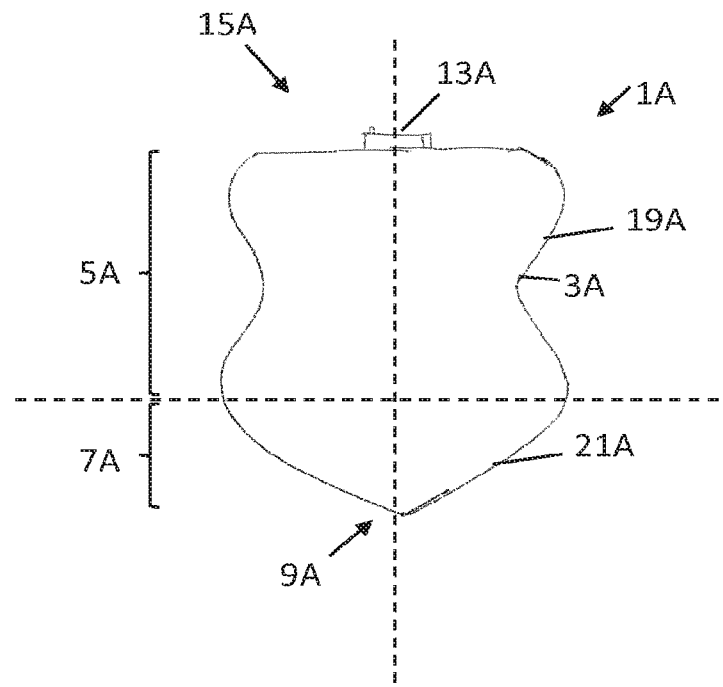
FIG. 2A illustrates a diagram of another example of a container of build material.

FIG. 2A illustrates an example container 1A of this disclosure where walls 21A of the upper portion 5A has an undulated shape, while a lower, funneled portion 7A converges to a bottom 9A. The upper portion 5A may locally show some conversion because of the undulated shape but a width of the container 1A at the top of the funnel 7A or bottom of the upper portion 5A, is approximately the same as a width of the container 1A at the top 15A of the upper portion 5A. The funnel 7A clearly has converging side walls 21A up to the bottom. Hence we refer to the upper portion as a relatively non-converging portion 5A with relatively non-converging side walls 19A, as compared to the funnel 7A.

Back to the example of FIG. 1, the lower portion of the reservoir 3 is a funnel 7 and includes at least one converging side wall 21. The funnel 7 may have a truncated and/or rounded bottom 9 onto which the converging walls 21 terminate. In different examples, the funnel 7 may include one round side wall or may have a rectangular cross-section of four converging side walls 21 with pointy or rounded borders between the side walls 21. Here we will discuss the upside-down-pyramid-shaped funnel 7 of four converging side walls 21. The pyramidal funnel 7 may allow for more build material storage than a conical (round) funnel 7 of the same diameter.

The inclination β of the funneled walls 21 can be chosen so that build material drops or slides towards the bottom 9, aided by gravity, thereby facilitating that build material can be collected from the bottom 9. For example the inclination β of the funneled walls with respect to a horizontal H can be between approximately 60 and approximately 20 degrees. In one example, the converging walls 21 of the funnel 7 are relatively straight. In other examples the funnel walls 21 can also be at least partially rounded and/or include different inclinations with respect to the horizontal H, for example at least partly within said range. The converging walls 21 may at least partly flex in a partly empty or an operational condition of the reservoir 3; the walls 21 may include wrinkles, curvatures, ridges, undulated shapes, etc., before, during or after pressure has been applied to the inside of the reservoir 3. The converging walls 21 may guide the build material 11 towards the bottom 9 from where the build material 11 can be readily collected for delivery to a respective additive manufacturing apparatus, thereby facilitating collection of most or all of the build material from the reservoir 3.

The reservoir 3 may be made of at least partly flexible material. For example, the reservoir 3 can be folded in an empty condition, the walls may flex in a partly empty or an operational condition of the reservoir 3, the walls 19, 21 may include wrinkles, curvatures, ridges, undulated shapes, etc. For example, upright walls of the upper portion 5 have a default substantially upright orientation in an unfolded, filled condition of the container 1. In another example, the reservoir 3 may be relatively rigid, or partly relatively rigid and partly relatively flexible.

In one example relatively flexible can be understood as allowing bending of the wall material, while a rigid material should be understood as resisting bending or stretching. A flexible material or compound can be elastic, e.g., PE or other polymer based materials, or non-elastic, e.g., Mylar or other materials including film layers that include a vapor barrier layer. In one example, a flexible and elastic wall material has a Young's modulus of less than approximately $1*10^9$ N/m$^2$ GPa, or less than approximately $0.3*10^9$ N/m$^2$ GPa. In one example a relatively rigid or non-elastic wall material has a Young's modulus of more than approximately $1*10^9$ N/m$^2$ GPa.

In one example, the build material 11 is to be collected from the bottom 9 with the aid of a collection unit 17. In the illustrated example the collection unit 17 extends from a top opening of the top outlet structure 13 to the bottom 9. In one example, the collection unit 17 can be a tube to suck in build material from the bottom 9 by applying a vacuum to the tube through an external pressure unit. The external pressure unit may generate a negative pressure to the reservoir to suck up build material, or may be configured to generate a negative and positive pressure, depending if it is switched to a fill or suction mode. In another example, the collection unit 17 can include a screw or spiral-type transport mechanism for retrieving build material.

The collection unit 17 can be part of the container 1 or part of the external collection system. Where it is part of the container 1, the collection unit 17 can be connectable to the external build material collection system. Where it is part of the container 1, the collection unit 17 is part of the outlet structure 13 of the container 1 whereby the build material is collected from the bottom 9 with the aid of an external collection system that connects to the collection unit 17 through the outlet structure 13. For example, the collection unit 17 is a tube and the collection system includes a pressure unit, whereby build material is sucked into the collection unit 17 by the pressure unit.

In the example where the collection unit 17 is part of the external collection system, it is to be inserted into the reservoir 3 to retrieve build material. Such external collection unit 17 could be inserted through the outlet structure 13.

Figure 2B:
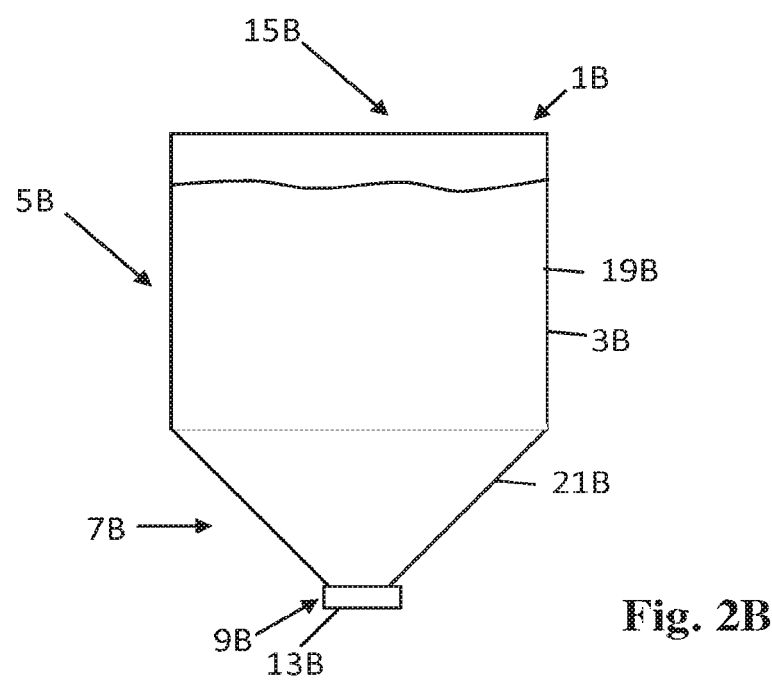
FIG. 2B illustrates a diagram of yet another example of a container of build material.

Another example container 1B is illustrated in FIG. 2B. The container 1B of FIG. 2B is similar to the container 1B of FIG. 1. The container 1B has an upper, non-converging portion 5B and a lower funnel 7B. The outlet structure 13B is provided in the bottom 9B to facilitate that powder can exit the reservoir 3B through gravity.

In the examples illustrated in FIGS. 1, 2A and 2B, the upper, non-converging portion 5, 5A, 5B of the reservoir 3, 3A, 3B covers most of the height h of the reservoir 3, 3A, 3B as measured between the bottom 9, 9A, 9B and the top 15. For example, the upper portion 5, 5A, 5B covers at least 50%, at least 60%, at least 70%, at least 80%, or at least 90% of the height h of the reservoir 3, 3A, 3B, as measured between the bottom 9, 9A, 9B and the top wall 15, 15A, 15B. The upper portion 5, 5A, 5B facilitates storing a relatively high volume of build material within a given width or diameter of the container 1, 1A, 1B. Only a smaller, bottom portion of the reservoir 3, 3A, 3B is funneled. In one example, between 5% and 40%, between 5% and 30%, between 5% and 20%, or between 5% and 10% of the bottom portion is funneled. Hence, where the container 1, 1A, 1B is a replaceable supply of virgin powder, many filled containers 1, 1A, 1B can be vertically and horizontally stacked for transport, whereby a relatively high amount of the total space consumed by the stacked containers 1, 1A, 1B is occupied by build material. At the same time, the funnel 7, 7A, 7B facilitates readily emptying these containers 1, 1A, 1B during additive manufacturing by collecting the build material from the bottom 9, 9A, 9B. The container 1, 1A, 1B may serve as a replaceable supply, to be replaced after emptying.

In different examples the build material reservoirs 3 are to hold build material volumes of for example approximately 5 to approximately 70 liters, approximately 10 to approximately 60 liters, for example approximately 30 liters. The weights associated with these volumes may depend on the build material, powder grain size, etc. Example containers 1 to hold these volume may be of a height of approximately 700 mm or less, approximately 650 millimeters or less, for example having a width of approximately 400 mm or less. These dimensions, and associated weights, may allow for readily handling the container 1 by an operator, for example to manually lift, stack and move the container 1. Also, the container 1 may be adapted to be folded, stacked and/or disposed of in an empty condition.

In certain examples, the container 1 can have larger build material volumes such as for example more than 50 liters, for example at least approximately 100, 150 or 200 liters.

Figure 3:
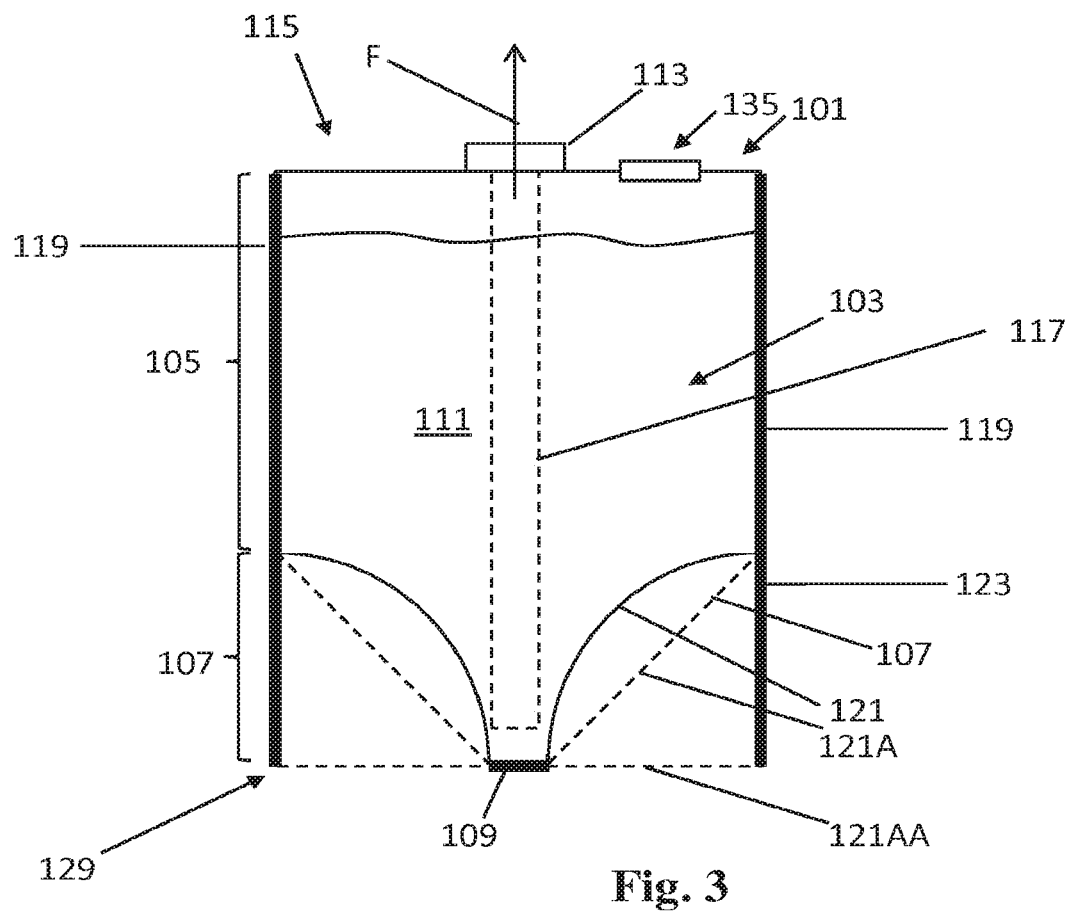
FIG. 3 illustrates a diagram of another example of a container of build material.

FIG. 3 illustrates a 3D printing build material container 101 that includes an at least partly flexible reservoir 103 and a reinforcement structure 123 to support at least parts of the reservoir 103. An outlet structure 113 having a first opening is provided in a top wall 115 of the reservoir 103 to allow build material to exit the reservoir 103. A throughput structure 135 that includes a second opening through the reservoir 103 is provided in the top wall 115 and may function as a vent. In the illustrated example, the reservoir 103 includes at least one wall 121 of a relatively flexible material that may at least partly bend and/or stretch under pressure. For example, the reservoir 103 is at least partly flexible to facilitate collapsing for transport, storage or disposal in an empty condition, and/or to facilitate flow of build material.

The reinforcement structure 123 is to reinforce the at least partly flexible reservoir 103. Walls of the reinforcement structure 123 are more rigid than walls of the flexible material. The reinforcement walls are to resist flexing or bending. The reinforcement structure 123 may include walls 125 that extend from a top 115 up to a bottom 109 of the container 101. The reinforcement structure 123 may include different sections or holes. The reinforcement structure 123 may generally be of a single material. The reinforcement structure 123 may form a base 129 or at least one foot of the container 101, whereby the funnel 107 may extend between the reinforcement walls that form the base 129. In one example the reinforcement structure 123 is to retain certain wall portions of the reservoir 103 in a predetermined shape during filled container transport and/or build material retrieval. For example, the reservoir 103 includes an at least partly flexible bag including plastics or multi-layer vapor barrier material, and the reinforcement structure 123 includes foldable material such cardboard, metal or relatively rigid compounds.

In one example the reinforcement structure 123 includes only one of a cardboard fold structure and a metal wireframe. In another example the reinforcement structure 123 includes cardboard fold structure and a metal wireframe. In other examples the reinforcement structure 123 may include molded or extruded plastics and may be separate or integral to the reservoir.

In one example, all four non-converging side walls 119 and four converging bottom walls 121 of the reservoir 103 are flexible. The reinforcement structure 103 extends on the outside and along the outer edge of the reservoir 103. Portions of the flexible reservoir walls 119, 121 are adhered to the outer reinforcement structure 123. Thereby the reinforcement structure 123 supports the flexible reservoir 103.

In one mode of operation, a vacuum F is applied to the reservoir 103 by connecting a vacuum system to the outlet structure 113. Thereby, build material is sucked out of the reservoir 103, through the outlet structure 113. Because of the vacuum applied to the reservoir 103 at least partly flexible lower walls 121 of the lower portion 107 may bulge inwards as illustrated by inwards bending lower walls 121 as a result of said vacuum F.

However, in a non-operational, filled state of the reservoir 103, the lower walls 121A or 121AA may have a default straight shape. In one example, the lower portion 107 may include inclined, converging walls 121A to form a funneled bottom. In another example the walls 121AA may form a relatively flat bottom wherein the walls 121B bulge inwards under vacuum pressure, to form a funneled shape, as illustrated by lines 121.

Any flexible wall material of the reservoir 103 that is not attached to the reinforcement structure 123 can change shape when a vacuum is applied. For example the flexible walls may vibrate, bend, flex, stretch, wrinkle, etc. when the vacuum is applied to the outlet structure 113. The wall movements and deformations may aid in moving the build material towards a collection area at the bottom 109. The wall movements may aid in stirring, mixing and/or retrieving the build material. The illustrated example container 101 further includes a longitudinal collection unit 117 that extends from the outlet structure 113 at the top 115 to near the bottom 109, to collect the build material 111 from the collection area near the bottom 109 and guide it out of the reservoir 103 through the outlet structure 113.

The reinforcement structure 123 may strategically reinforce certain portions of the reservoir 103 while allowing flexible portions to flex. The reinforcement structure 123 may inhibit that the flexible wall material could isolate build material from the collection area, for example in pockets in the flexible wall. In one example, the reinforcement structure 123 reinforces two opposite non-converging side walls 119 of the reservoir 103, while allowing two other, non-attached non-converging side walls 119 to bend inwards. In one example, the reinforcement structure 123 reinforces at least portions of all four converging bottom walls 121. In another example, the reinforcement structure 123 reinforces two opposite converging bottom walls 121, while allowing two other opposite converging walls 121 to bend inwards.

Flexible reservoir walls 119, 121 can be relatively elastic or relatively non-elastic. An example of a relatively elastic reservoir wall can be made of polyethylene or thin-walled PET. An example of a non-elastic flexible wall material includes a metal film layer. An elastic wall material can have a Young's modulus of less than approximately $1*10^9$ N/m$^2$ GPa, or less than approximately $0.3*10^9$ N/m$^2$ GPa. A reinforcement wall material can have a Young's modulus of more than approximately $1*10^9$ N/m$^2$ GPa.

The reservoir walls 119, 121, 109, 115 may form a vapor and/or gas barrier, having a relatively low gas/vapor permeability, for example to inhibit degradation of the build material. In an example of a flexible reservoir, the wall material may include a metallized barrier film or polymer barrier material, for example mylar, polyethylen (PE), thin PET, respectively.

Figure 3B:
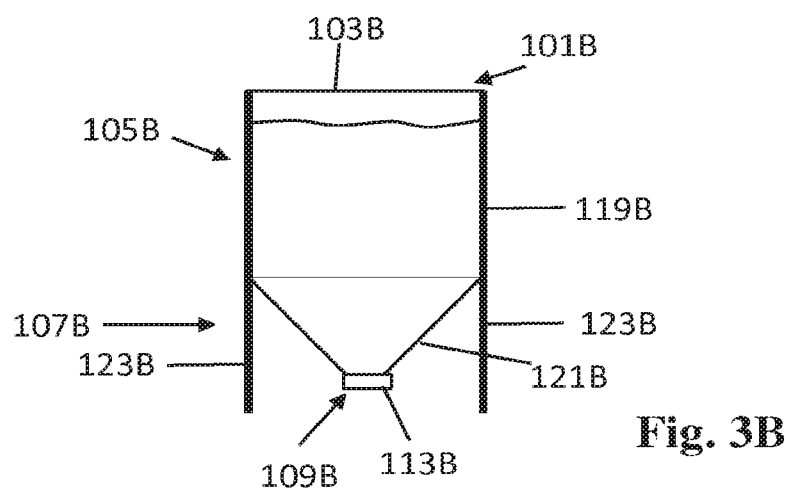
FIG. 3B illustrates a diagram of another example of a container of build material.

FIG. 3B illustrates an example of a container 101B with an at least partly flexible reservoir 103B. The container 101B has similar properties to the container 101 of FIG. 3 except that the outlet structure 113B is provided at the bottom 109B, for example to facilitate gravity fed build material dispensing. The container 101B can include a reinforcement structure 123B. In one example the reinforcement structure 123B may support to the at least partly flexible reservoir 103B along the upper portion 105B. For example the reinforcement structure 123B may adhere to at least two opposite walls of the upper portion. The reinforcement structure 123B may form a base of the container 101 to allow the container 101B to stand in an upright fashion with the funneled portion 107B and outlet structure 113B towards the bottom 109B. In an example the reservoir 103B may be formed by a flexible plastic bag and the reinforcement structure 123B may be formed of cardboard.

Figure 4:
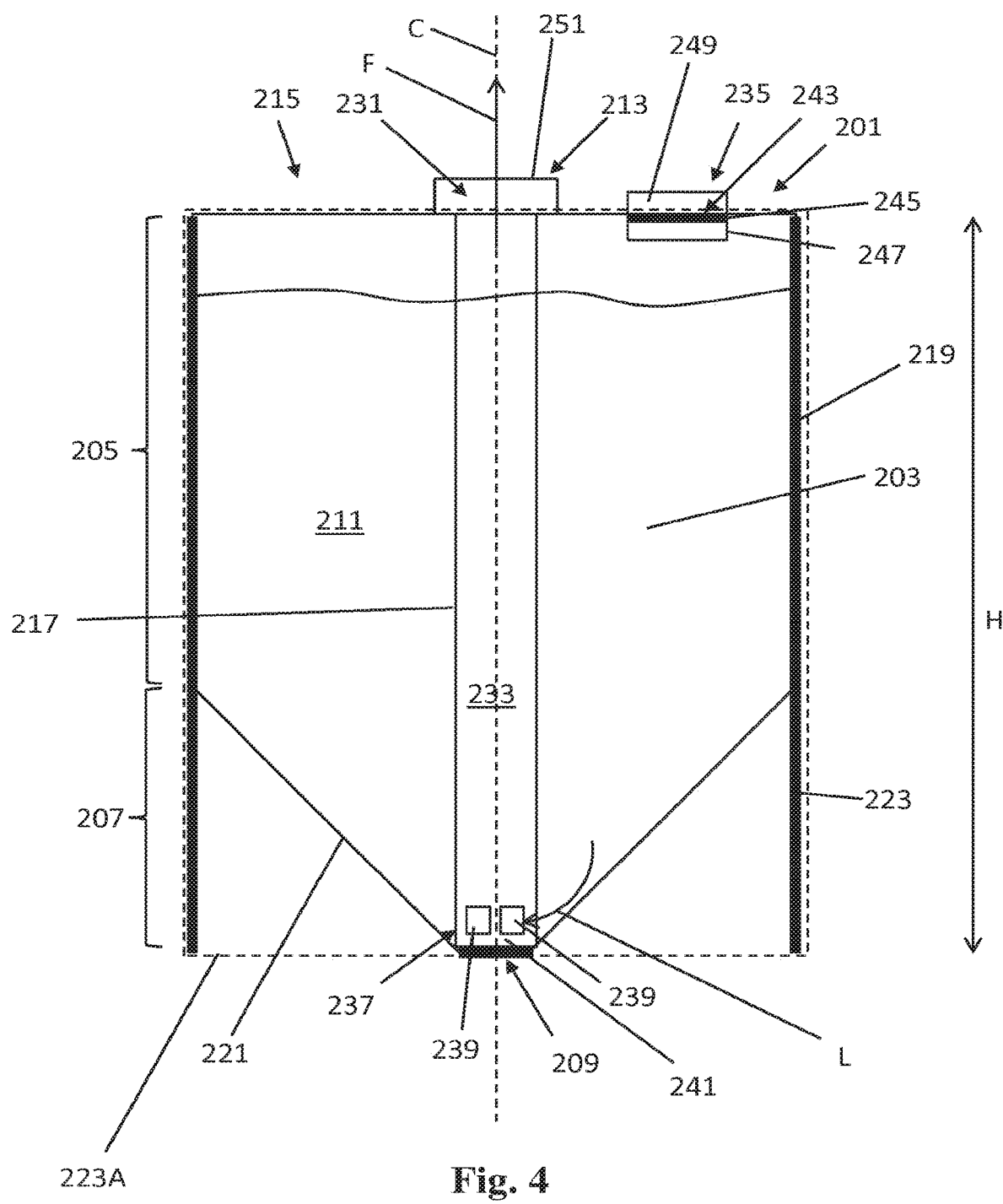
FIG. 4 illustrates a diagram of yet another example of a container of build material.

FIG. 4 illustrates another example container 201 for build material 211, including a build material reservoir 203. The reservoir 203 may be at least partly flexible. The container 201 can be provided with a reinforcement structure 223, 223A. The reinforcement structure 223, 223A may be provided along the outside of the reservoir 203, and attached to portions of the reservoir 203, to support the reservoir 203. The reinforcement structure 223, 223A may include an inner support structure 223 to support the reservoir 203 and an outer shell structure 223A around the inner support structure 223. The outer shell structure 223A may provide for bottom protection, display area, additional support, etc.

The container 201 has an upper portion 205 and a lower portion 207, or funnel, wherein the upper portion 205 includes non-converging, for example substantially upright, walls 219 and covers most of the height h of the container 201. The container includes an outlet structure 213 having an outlet opening 231 at the top side to allow the build material 211 to exit the reservoir 203 from the top side 215. The outlet structure 213 may include an adaptor 251 to connect to an external pressure unit, such as a vacuum source, to facilitate retrieving build material from the reservoir 203 by vacuum suction.

In the illustrated example, the lower portion 207 is funneled to guide build material towards a center collection area at a bottom 209 of the reservoir 203 under influence of gravity and/or pressure generated by the pressure unit. The funnel is formed by inclined, converging walls 221.

The container 201 includes a longitudinal collection unit 217 that extends from near the top 215 to the bottom 209 to collect build material from the bottom 209. The collection unit 217 can form a fixed or detachable part of the outlet structure 213. The collection unit 217 is to collect the build material from the collect area at the bottom 209, and to guide the build material out through the outlet opening 231 at the top 215. In one example, the collection unit 217 is at least partly tube-shaped. The tube-shaped unit 217 extends from the outlet opening 231 at the top 215 to the center bottom 209 of the reservoir 203. The collection unit 217 extends along the non-converging, e.g. upright, upper portion 205, and into the funnel 207 to collect build material from the bottom 209 of the funnel 207. The collection unit 217 can be a rigid tube 233 or a flexible hose.

In one example, the collection unit 217 is to facilitate vacuum suction through its tube 233. In such example, the adaptor portion 251 of the outlet structure 213 is arranged to connect to a pressure unit of an additive manufacturing apparatus so that, when the pressure unit is connected to the outlet structure 213, and switched on, a build material (and air) flow is established through the tube 233 in an upwards direction F.

In an example, the container 201 includes a throughput structure 235 in the top wall 215 next to the outlet structure 213 to facilitate venting air into the reservoir 203 during vacuum suction. In another example, the reservoir 203 is at least partly flexible whereby during said vacuum suction certain wall portions may flex inwards and/or vibrate. In a further example the pressure unit may apply a positive pressure to the reservoir 203, for example when filling or flushing the reservoir 203.

In one example the reservoir 203 has an inner volume of between approximately 5 and 70 liters and the tube 233 can have a length, between the outlet opening 231 and a distal end 241, of approximately 40 to 65 centimeters. The tube 233 can have a diameter between approximately 10 and 70 millimeters, for example between approximately 25 and 60 millimeters.

Build material is to enter the tube 233 in a distal end portion 237 of the tube. The end portion 237 extends near the bottom 209 to extract the build material from the bottom 209. In a further example the end portion 237 touches the bottom 209 whereby the tube 233 may provide additional structural reinforcement to the container 201, for example in addition to the reinforcement structure 223. The end portion 237 includes at least one inlet or suction opening 239 through which the build material is to enter. In one example, the end portion 237 includes threads or surfaces between which multiple of such suction openings 239 extend. In an example the end portion 237 may include a filter to inhibit that undesired particles are provided to the collection system.

In one example the end portion 237 of the tube 233 includes lateral openings 239 whereby in operation the build material enters the tube 233 in an at least partly lateral direction L. The end portion 237 may further include a distal end structure 241 such as a cap or thread. In an example the distal end structure 241 engages the reservoir bottom 209. The lateral openings 239 extend at least partially above the distal end structure 241 so that in operation build material enters into the tube 233 laterally, above the distal end structure 241. The distal end structure 241 may prevent that the bottom wall portions block the suction openings 239.

Figure 4B:
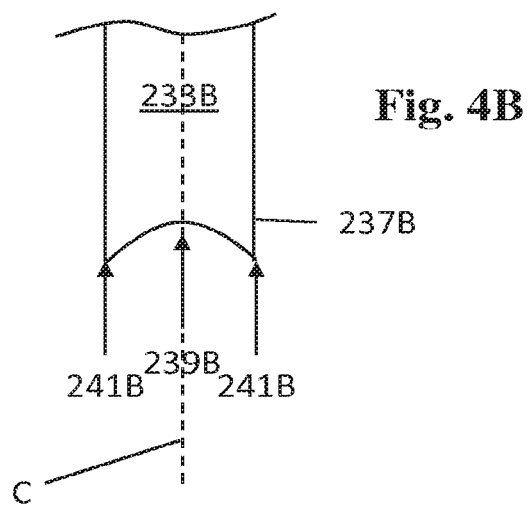
FIG. 4B illustrates a diagram of an example of an end portion of an vacuum tube.

FIG. 4B illustrates another example of an end portion 237B of a build material vacuum tube 233B in a cross sectional front view. The tube 233B has a central axis C. The end portion 237B includes distal end structures 241B that define lowest points of the tube 233, for example to engage a reservoir bottom. Lateral openings 239B provide for a build material entry points above the distal end structures 241B. In the illustrated example the lateral openings 239B are part of a single, integral tube end opening at the end of the tube 233B.

The container 201 of FIG. 4 further includes an air/build material throughput structure 235 that facilitates venting. The throughput structure 235 is provided next to the outlet structure 213, in or near a top wall 215 of the reservoir 203. In addition to venting, the throughput structure 235 is adapted to allow an operator to (i) add build material to the reservoir 203, and/or (ii) pour build material out of the reservoir 203. Hence, the throughput structure 235 includes an opening 243 through the reservoir to allow, in one mode, air, and in another mode, build material to pass. Having the throughput structure 235 in the top wall 215 facilitates venting, also when the reservoir 203 is filled up to the top. The throughput structure 235 can be positioned between the outlet structure 213 and a lateral side wall 219 of the reservoir 203, for example at a distance from the outlet structure 213, relatively near the lateral side wall 219 of the reservoir 213. A position near the side wall 219 facilitates pouring build material directly from the reservoir 203.

The throughput structure 235 includes a filter 245 that covers the opening 243, to allow air to pass while retaining build material, in a vent mode. The throughput structure 235 includes a filter holder 247 to hold the filter 245. The filter holder 247 with filter 245 can be decoupled from the reservoir 203, to allow build material to pass through the opening 243, for filling or pouring of build material. The reservoir 203 may include an opening with a flange and screw-threaded neck to connect and disconnect the filter holder 247. Without the filter 245, build material may exit the reservoir 203 through the opening 243 to facilitate pouring the build material out of the reservoir 203. Without the filter 245, build material may enter the reservoir 203 to fill the reservoir 203.

The outlet structure 213 and throughput structure 235 may be sealed with at least one suitable seal structure, for example a seal film that is adhered over each respective opening 231, 243. In one example, a filled container 201 is sealed with a one-time seal after it is filled with virgin build material in a filling station. In addition, a cap or lid 239 may be provided over each of the outlet structure 213 and throughput structure 235.

Figure 5:
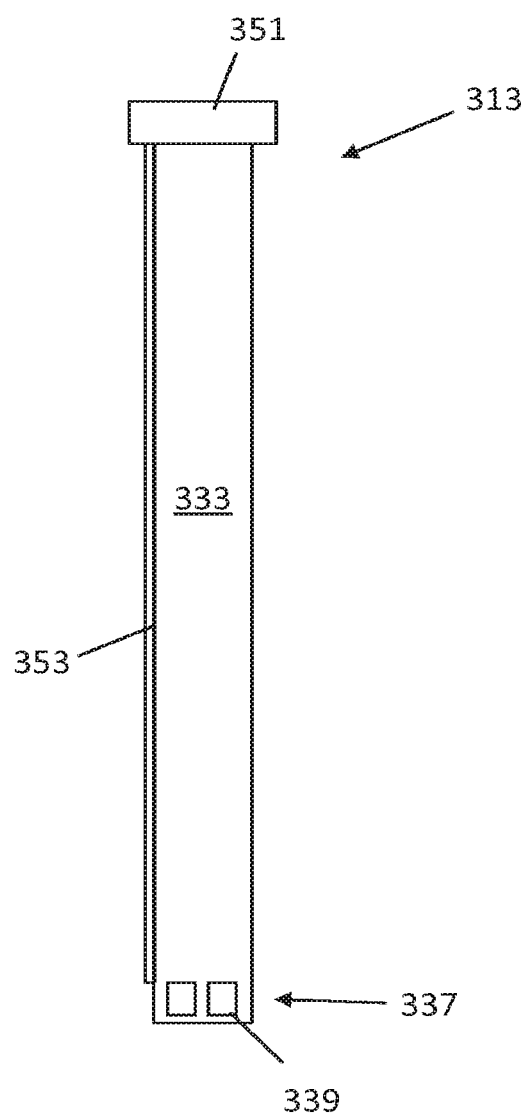
FIG. 5 illustrates a diagram of an example of a build material outlet structure.

FIG. 5 illustrates an example of an outlet structure 313 including a build material collection tube 333. The build material collection tube 333 may include an end portion 337 at its distal end with at least one build material vacuum suction opening 339. In operation, the tube 333 may extend within a build material reservoir to collect build material from a bottom of the reservoir. The tube 333 is connected to an adaptor 351 at its proximal end to connect to an associated external pressure unit. In the illustrated example, the collection tube 333 further includes an air channel 353. The air channel 353 may extend along a length of the tube 333. The air channel 353 includes a proximal opening 355 that is to communicate with ambient air and a distal opening 357 that is to communicate with the inside of a reservoir, for example near a bottom build material collection area in the reservoir. In one example, the air channel 353 may provide for a vent connection between ambient air, having an inlet near a top of the outlet structure 313, and the build material collection area at a bottom of the reservoir, in addition to another vent opening at a top side of the reservoir (e.g. see FIG. 4). The air channel 353 may facilitate readily collecting the build material from the bottom 209, for example aiding in creating turbulence near the bottom 209.

The air channel 353 may be integral to the tube 333. In one example one or more air channels 353 extends parallel to the vacuum channel in the tube 333, next to the vacuum channel of the tube 333. In another example, the air channel 353 extends concentric to the vacuum channel in the tube 333, i.e. around at least part of the vacuum channel, whereby the tube 333 includes two concentric tubular walls around a center axis.

Figure 6:
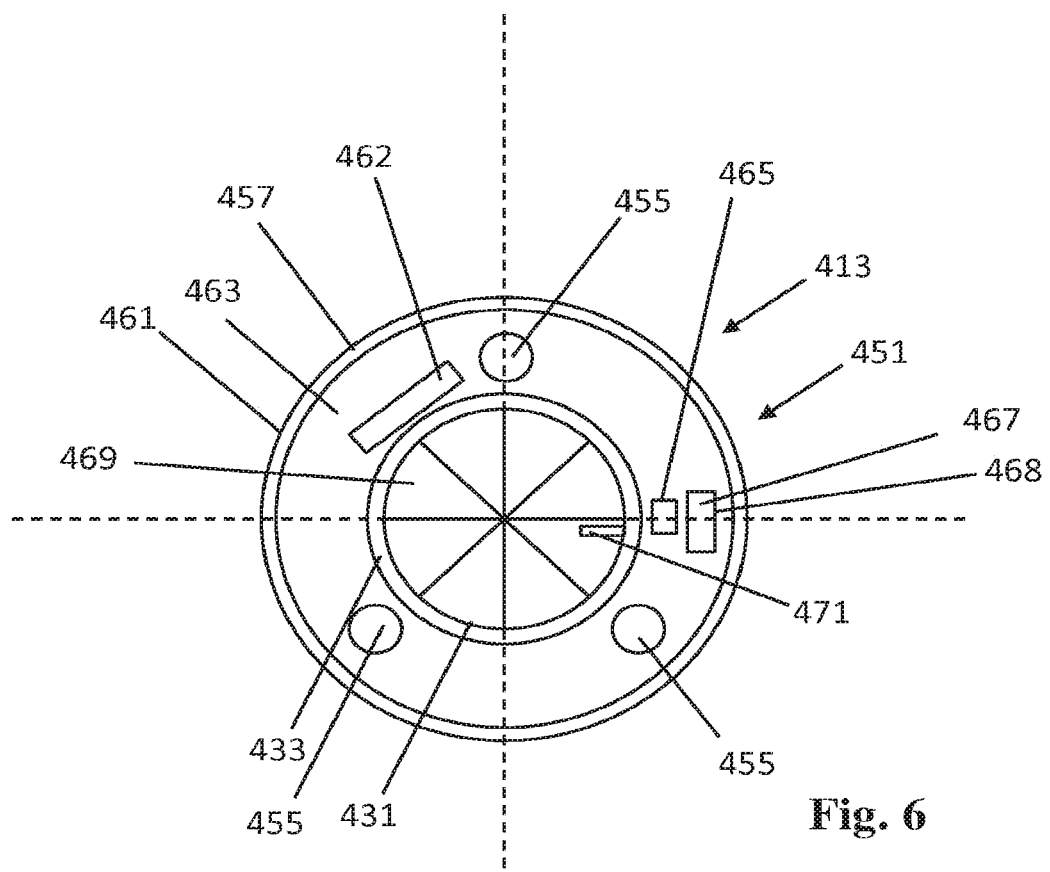
FIG. 6 illustrates a diagrammatic top view of an example of a build material outlet structure.

FIGS. 6-8 illustrate diagrams of adaptor portions of an outlet structure 413 and an associated pressure unit 459. FIG. 6 illustrates a diagrammatic top view of an outlet structure 413. FIG. 7 illustrates a diagrammatic partly cross-sectional side view of an end portion of an external pressure unit 459 to be associated with the outlet structure 413. FIG. 8 illustrates a diagrammatic cross-sectional side view of the outlet structure 413.

The outlet structure 413 includes an adaptor 451 to connect to the pressure unit 459. The outlet structure 413 includes an outlet opening 431 in its center to provide access to an inside of a reservoir, for example via an outlet tube 433 that protrudes from a bottom of the adaptor 451 downwards into the reservoir up to a reservoir bottom 409.

In the illustrated example, the adaptor 451 is wider than the tube 433. The adaptor 451 includes at least one upright wall 457 along an outer edge 461 of an interface face 463 of the adaptor 451. The upright wall 457 may be a single circular, circumferential wall. The upright wall 457 may serve to guide a corresponding adaptor 475 of the corresponding pressure unit 459 into interconnection.

An inner wall of the tube 433 can function as a first guide feature because it guides a pressure snout 473 into the outlet structure 413. The upright wall 457 may function as a second guide feature because it may guide the pressure unit adaptor 475 into the outlet structure 413. The upright wall 457 protrudes in an air/build material flow direction A. The pressure unit 459 may fit within the wall of the circumferential upright wall 457, or around it.

The interface face 463 extends annularly around the outlet opening 431, within the upright wall 457, orthogonal to the air/build material flow direction A. Several interface elements can be provided in the annular interface face 463. In one example, certain further guide features may be provided in the interface face 463 to assist in guiding and coupling the pressure unit 459 to the outlet structure 413, such as a digital interconnect pocket 468, which may serve as a third guide feature. Again a further guide feature can be a guide slot 462 that is to guide a corresponding protrusion of a pressure unit 459, or vice versa: a guide protrusion to guide a corresponding slot in the pressure unit 459.

The adaptor 451 may include at least one magnetic guide feature 455 or other further guide/latch feature in the interface face 463. The magnetic guide feature 455 includes at least one magnetic element, such as a magnetic metal or magnet, to attract to a corresponding magnetic element in the external pressure unit 459. The magnetic guide feature 455 is to attract the pressure unit adaptor 451 when the magnetic elements 483 of the pressure unit 475 are close to the magnetic guide features 455. The magnetic guide feature 455 may attract the snout 473 into a final interconnected state whereby the attraction force and subsequent clicking sound of the magnetic guide features 455 may provide feedback to an operator that the outlet structure 413 and snout 473 are properly connected. The magnetic attraction may also provide for some level of retention force between the interconnected snout 473 and outlet structure 413. The retention of the snout 473 and adaptor 451 is further helped by the vacuum suction force. For the magnetic guide features 455 to attract the pressure unit 459, the adaptor 451 and snout 473 need to have the proper rotational orientation with respect to each other. The magnetic guide features 455 may facilitate a robust and user friendly interconnection, which, e.g., may work well in a dusty environment.

Other guide features of the outlet structure 413 can include protrusions, rails, notches, slots etc., for example male or female elements of interconnecting structures can be provided on both interconnecting adaptors 451, 475. Furthermore, retain features such click fingers, latches, notches, friction fit elements, etc. can be provided, to latch to the pressure unit so that the adaptor 451 and pressure unit 459 remain coupled, for example by hooking, latching, friction, etc. also when the pressure unit is not turned on. The magnetic guide features 455 also serve as retain feature.

The adaptor 451 can further include a sensor trigger structure 465. In an example the trigger structure 465 protrudes from the annular interface face 463, to trigger a sensor device of the pressure unit 459, for example optically or mechanically. The trigger structure 465 can be a cubical or cylindrical protrusion, integrally molded with the main adaptor structure. The adaptor 451 further includes a data interface 467. The data interface can be provided in the interface face 463, for example in a pocket 468 of the interface face 463. The data interface 467 itself may be formed by contact pads of a memory chip, microcontroller, integrated circuit, smart chip, etc. The data interface 467 is to connect to a corresponding data interface 487 that is provided on the pressure unit 459.

The outlet structure 413 may further include a valve 469 to cover the outlet opening 431. The valve 469 may extend inside the tube 433. The valve 469 is to inhibit that build material, for example powder dust, exits the reservoir when the pressure unit 459 is not connected. In one example the valve 469 is to open by at least one of (i) enough pressure onto the outlet structure 413 by the pressure unit 459, and (ii) an external adaptor tube or the like that is inserted in the outlet structure 413 and thereby pushes the valve 469 to open. In the illustrated example the valve 469 is a flexible film valve, for example of four flexible films that each form a quarter of a circle and that protrude from the inner wall of the tube 433. FIG. 8 illustrates the film valve films 469B in a closed condition and in an open condition, the latter in dotted lines. The film valves 469B open by insertion of the snout 473 and flex back into closing position when the snout 473 is withdrawn from the outlet structure 413.

The adaptor 451 may further include a protruding finger 471 that protrudes from an inner wall of the tube 433, in a direction upwards. In the illustrated example the finger 471 protrudes, first, away from the inner wall, and then points upwards towards the outlet opening 431 in order to push-open a corresponding valve in the pressure unit 459.

FIG. 7 illustrates an example of an end portion of a pressure unit 459 that is associated with the outlet structure 413 of FIGS. 6 and 8. The pressure unit 459 can be part of an additive manufacturing apparatus or of a separate collection system. FIG. 7 illustrates examples of a snout 473, adaptor 475 and tube 477 of the pressure unit 459.

The snout 473 can be tube-shaped, with an outer wall diameter that corresponds to an inner diameter of the outlet tube 433 of the container 401 to facilitate that the snout 473 slides into the tube 433 in an insertion direction I, opposite to the vacuum suction direction A. The snout 473 is shorter than the tube 433, for insertion into only an upper portion of the tube 433 only. The snout 473 may fit in the tube 433 to suck in build material from the reservoir 403 while inhibiting that build material settles between the outer wall of the snout 473 and the inner wall of the tube 433. In an example a friction fit may be established between the snout 473 and the tube 433.

A valve 479 can be provided in the snout 473 to close the snout 473, for example when the pressure unit is turned off. The closed valve 479 may inhibit that build material exits the snout 473 when the vacuum is turned off. In the illustrated example the snout valve 479 is a round swivel valve, the outer diameter of which matches an inner diameter of the snout. The valve 479 can be positioned near the inlet opening 481 at the distal end of the snout 473. The finger 471 in the outlet tube 433 engages the valve 479 at insertion of the snout 479 in the tube 433, thereby push-opening the valve 479 so that build material can freely flow into the snout 479. At the same time the other valve 469, 469B, in the outlet tube 433, is opened by the snout 473.

The adaptor 475 of the pressure unit 459 can include magnetic elements 483 such as magnets to attract associated magnetic guide features 455 of the outlet adaptor 451, to facilitate proper interconnection between the snout 473 and the outlet structure 413. Also, when the pressure unit 459 is switched on, the vacuum itself may retain the snout 473 and outlet structure 413 in interconnected state. The adaptor 475 may include a sensor circuit 485 that senses the protruding sensor trigger structure 465 of the outlet adaptor 451. The sensor circuit 485 may signal a controller or servo of the pressure unit 459 or additive manufacturing apparatus that proper interconnection has been established, for example to switch on the pressure unit 459 and/or to open a further internal valve unit internal to the pressure unit 459. Thereby the pressure unit 459 is only switched on during a proper mechanical and electrical interconnection with the build material container 401. The pressure unit adaptor 475 can further include a data interface 487 that is to interconnect with the data interface 467 of the outlet adaptor 451. In one example the data interface 487 may provide data including authentication data and build material data to a controller of the pressure unit 459 or additive manufacturing apparatus. The controller may authenticate the container based on the read data. In one example the pressure unit 459 is switched on only if authentication is established. In a further example both the sensor trigger structure 465 and the data interface 467, including authentication data, need to be properly interconnected to switch on the pressure unit 459.

The outlet structure 413 and associated elements of FIGS. 6-8 can be mounted to any example container of this disclosure, for example a container as illustrated in any of the foregoing FIGS. 1-5.

Figure 9:
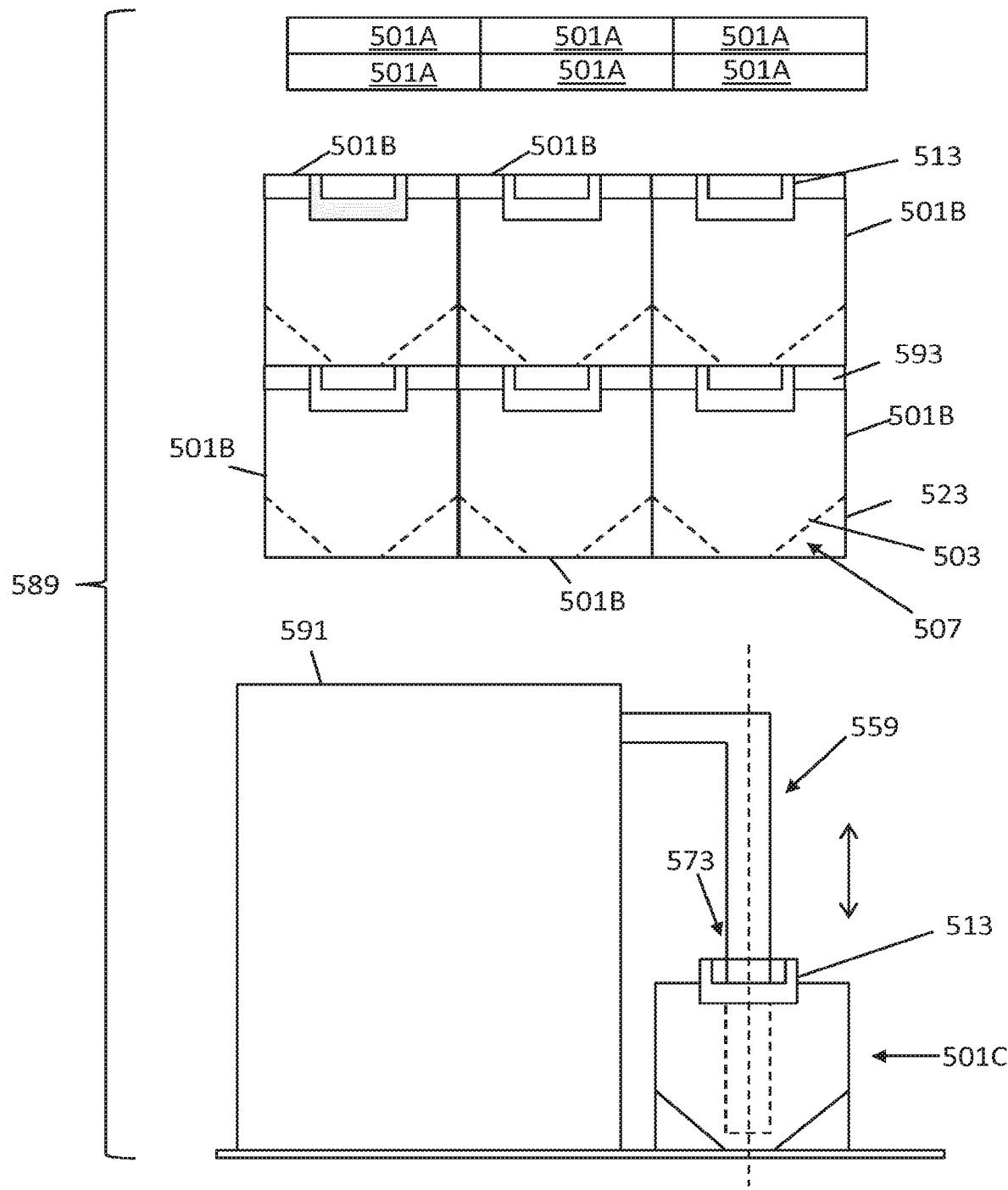
FIG. 9 illustrates a diagram of an example of an additive manufacturing system including multiple containers.

FIG. 9 illustrates an additive manufacturing system 589 including containers 501A, 501B, 501C of this disclosure. The containers 501A, 501B, 501C represent the same container in different states, during different points in a use scenario. At the top of the drawing, a batch of horizontally and vertically stacked, substantially empty containers 501A is illustrated. The containers 501A are collapsed for transport to a fill station and/or powder manufacturer. In the middle, a batch of horizontally and vertically stacked, filled, containers 501B is illustrated, for example for filled transport to, or storage before interconnection with, an additive manufacturing apparatus 591. At the bottom, the additive manufacturing apparatus 591 and interconnected container 501C are illustrated. The illustrated components of the system 589 of FIG. 9 may correspond to any of the containers and components discussed in relation to the previous figures, and hereafter.

Each collapsed container 501A may include an empty, at least partly flexible reservoir. The containers 501A may include a folded reinforcement structure attached to the collapsed reservoir. To that end, the reinforcement structure may include fold lines. The reservoir can be selectively attached to the reinforcement structure so as to allow (i) collapsing/folding, and (ii) expanding/unfolding, while both structures remain attached to each other. In another example the reservoir and reinforcement structure may be attached and detached after and before collapsing, respectively, by a separate action. The stacked and collapsed containers 501A may be transported from a package manufacturer to a build material filling facility, or the collapsed containers 501A may be returned after exhaustion, by a user, to a refilling station.

In one example, the collapsed containers 501A include separate collapsed parts, such as for example a separate collapsed reservoir and reinforcement structure, or parts of each, that are adhered downstream of a filling or transportation process. In one example, certain rigid components such as an outlet structure or throughput structure, as explained in relation to some of the foregoing figures, are (dis)connectable to be transported separately.

Containers 501B of the stacked set of filled containers 501B, in the middle of FIG. 9, each include a reservoir 503 filled with build material. Each reservoir 503 may have a funneled bottom portion 507 and a reinforcement structure 523 that reinforces the filled reservoir 503. The reinforcement structure 523 may function as support for the rest of the container 501B. Each container 501B includes an outlet structure 513. In one example the outlet structure 513 is sealed until the container 501B is opened for usage (see bottom of drawing). In another example, the container 501B includes a removable or openable cover 593 on the top side. In one example, the cover 593 aids in sealing, protecting and stacking the container 501B. The container 501B is both transport and usage-ready. The containers 501B can be readily connected to an additive manufacturing apparatus 591 and replaced after usage. All containers 501B may have similar features, or at least a similar outlet structures 513, to interconnect to the tube snout 573 of the additive manufacturing apparatus 591.

The additive manufacturing apparatus 591 includes a pressure unit 559 to suck build material from the container 501 through a vacuum tube snout 573. The pressure unit 559 includes a vacuum pump. The pressure unit 559 and container 501 may include interconnecting adaptors to facilitate interconnection of the outlet structure 513 and snout 573, and inhibit powder leakage before, during and after vacuum suction. The additive manufacturing apparatus 591 may further include at least one of a build material recycling system In certain examples, the additive manufacturing apparatus 591 includes a fusing agent dispenser, e.g., a printhead, in addition to the recycling system. The additive manufacturing apparatus 591 may further include a build material return system to (re)fill the container 501, for example for buffering or recycling the build material. To that end, the pressure unit 459 may include a bi-directional air pump, to facilitate both build material retrieval from, and build material filling of, the reservoir 503.

The illustrated additive manufacturing system 589 may provide for a relatively low cost, clean, replaceable and disposable container 501A, 501B, 501C. The container 501A, 501B, 501C is adapted for multiple purposes including transport, host apparatus interconnection, build material collection, collapsing into a flat stackable structure, easy disposal, single fill usage, multiple fills usage, recycling, storing, lifting by an operator, etc. The container facilitates relatively easy interconnection with the host apparatus while inhibiting build material (e.g. powder) leakage from the system 589. In one example, the container inhibits that build material powder dust escapes to the environment, during the container life cycle, i.e. during filled transport, apparatus interconnection, retrieval, until exhaustion. Any operator of, say, average force and capability, may replace multiple containers in a limited time span, with a limited amount of education, and with a relatively low risk of being exposed to too much powder dust. In addition, the collapsible container allows for easy disposal or return. In one example, using cardboard as one of the primary container materials helps in making the container bio-degradable.

Figure 10:
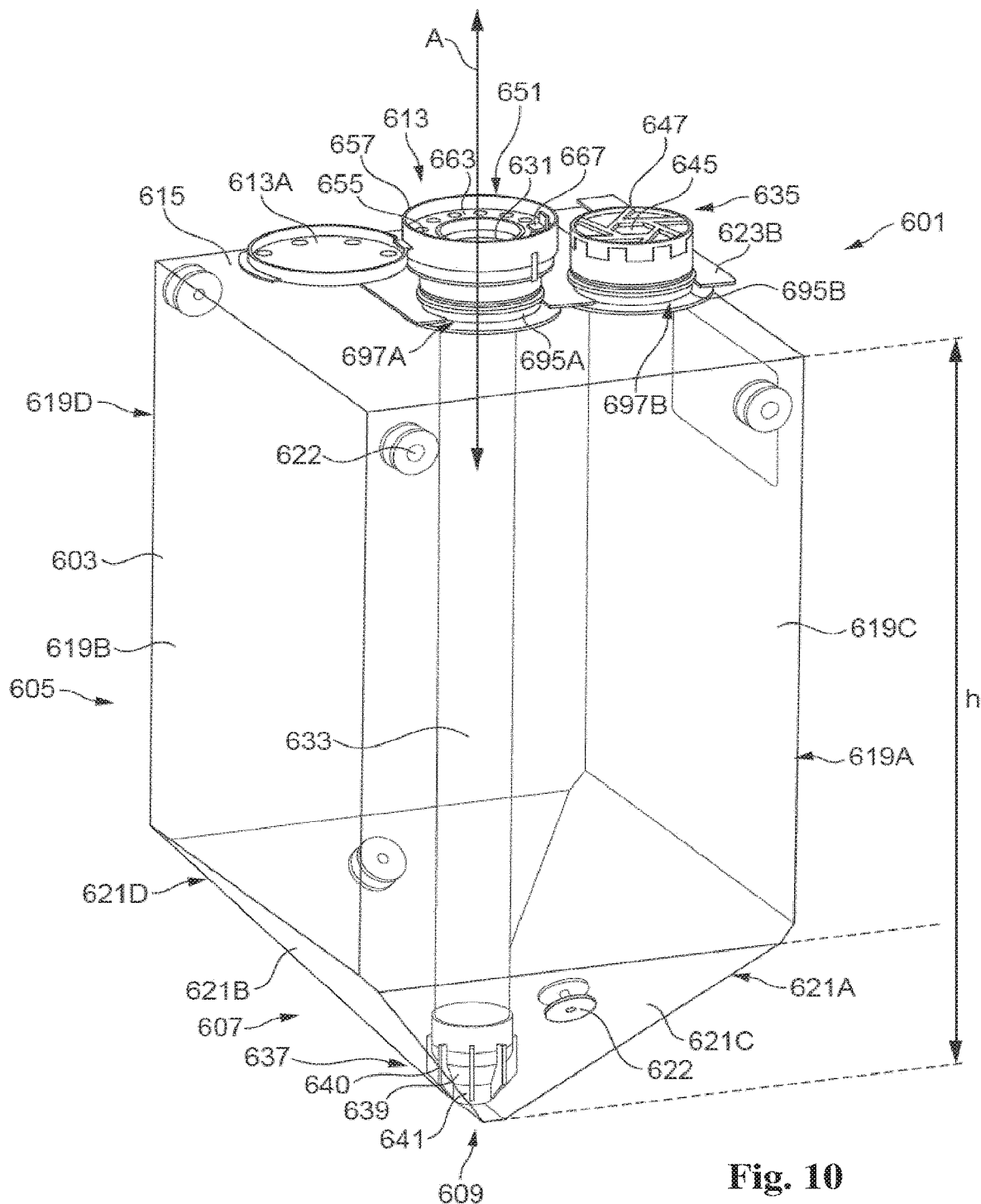
FIG. 10 illustrates a diagram of another example of a container of build material.

FIG. 10 illustrates an example of a container 601 that includes a reservoir 603. In this example, the reservoir 603 is a flexible bag. The reservoir 603 is illustrated in an expanded yet substantially non-stressed state. The reservoir 603 includes an upper portion 605 of non-converging walls 619A, 619B, 619C, 619D that extend between a top wall 615 and a lower, funneled portion 607. The upper portion 605 may be generally cubical shaped. The reservoir 603 further includes the lower, funneled portion 607 of triangular shaped converging walls 621A, 621B, 621C, 621D that converge to a bottom line 609. The lower funneled portion 607 is substantially pyramidal shaped, with the slight difference that its walls 621A, 621B, 621C, 621D converge to a line. All walls 615, 619A, 619B, 619C, 619D, 621A, 621B, 621C, 621D are of a single, integral, flexible plastic bag structure.

The funneled portion 607 may extend over approximately 3% to 40%, or approximately 3% to 25% of a total height h of the reservoir bag, as measured from a bottom 609 to a top wall 615. In the illustration the inner volume of the reservoir 603 is approximately 10 to 60 liters, or 15 to 50 liters, although a similar structure could be suitable for smaller or larger inner volumes.

The container 601 further includes an outlet structure 613 and throughput structure 635 that are provided on the top wall 615. The outlet structure 613 is to connect to a pressure unit of an external collection system for retrieving the build material from the container 601. The throughput structure 635 is to vent air into the container 601, in a first mode, and can be detached to manually pour build material out of the container 601, in a second mode. Also the outlet structure 613 is detachable.

The container 601 includes a first opening 697A and a second opening 697B in a top wall 615. The first and second opening 697A, B extend next to each other. A relatively rigid opening connector 695A, 695B is attached to the top wall 615, around each opening 697A, B, respectively. Each rigid opening connector 695A, 695B includes a screw threaded cylindrical neck portion, for connecting the outlet structure 613 and throughput structure 635, respectively, and a flange portion around the screw threaded neck portion, wherein the flange portion may extends partially parallel to the top wall 615, substantially orthogonal to a central axis of the neck portion. The flange portion may be staked or adhered to the top wall 615 so as to prevent leakage. In an example, the first opening 697A and respective opening connector 695A extend in or near a center of the top wall 615 and the second opening 697B and respective opening connector 695B extend between said first opening 697A and a side wall, away from a center of the top wall 615, at least in the illustrated expanded condition of the reservoir 603. The first and second opening connectors 697A, 697B facilitate readily attaching or detaching the outlet structure 613 and throughput structure 635. When the outlet structure 613 and throughput structure 635 are detached, and the reservoir 603 is empty, the rest of the reservoir 603 can be readily collapsed.

In the illustrated example, the outlet structure 613 is screw fitted to the first opening connector 695A. In addition the outlet structure 613 includes an openable and closeable lid 613A, an adaptor 651, an outlet opening 631 through the adaptor 651, and a longitudinal outlet tube 633 extending from the outlet opening 631 into the funneled reservoir portion 607. The adaptor 651 may facilitate a relatively easy and reliable interconnection with a snout of an additive manufacturing system. The adaptor 651 includes at least one upright, circumferential wall 657 along an outer edge 661 of an annular interface face 663 the adaptor 651. The interface face 663 extends around the outlet opening 631, between the outlet opening 631 and the upright wall 657, orthogonal to the build material/air flow direction A. Several interface elements are provided in the interface face 663, within the circumferential wall 657, including at least one magnetic guide feature 655, a data interface 667, and a protruding sensor trigger structure.

In one example an end portion 637 of the tube 633 includes lateral build material inlets 639, for example between fins 640. In an example at least four fins and four inlet openings are evenly distributed around the end portion 637. The fins 640 may protrude laterally from the diameter of the tube 633 to keep flexible reservoir material from blocking the inlets 639 and in addition may provide for a turbulence feature. The end portion 637 may further include a cap 641. The cap 641 may also allow for build material to enter the tube 633 while keeping the flexible bottom walls of the reservoir 603 from blocking the openings 639. In an example the cap 641 touches the reservoir bottom 609, so that the entire outlet structure 613 provides for additional structural reinforcement of the reservoir 603. The adaptor 651, tube 633, and end portion 637 may fitted to each other, and may be readily connectable and disconnectable.

The throughput structure 635 is connected, for example screw fitted, to the second opening connector 695B. The throughput structure 635 may include a filter holder 647 and filter 645. The filter 645 covers the second opening 697B to allow air to pass through while retaining build material. The throughput structure 635 can be disconnected, e.g., unscrewed, to allow build material to pass through the second opening 697B. The second opening 697B may extend closer to a side wall than the first opening 697A to facilitate manually pouring build material out of the reservoir 603. The outlet structure 613 can be closed off by the lid 613A during such pouring. Hence, the container 601 facilitates both automatic vacuum build material retrieval, through the outlet opening 631, and manual pouring of the build material, through the second opening 697B.

The illustrated container 601 may be a flexible reservoir, for example made of PE. In a filled and sealed condition, seal films may seal the outlet structure 613, e.g., over the interface face 663 and under the lid 613A, and the throughput structure 631, e.g., over the filter, to inhibit that too much ambient air and/or vapor contacts the powder. The seal films can be removed before usage.

In a further example, a reinforcement structure can be attached to the reservoir 603, to support the reservoir 603. In an example, the reinforcement structure extends adjacent all of the walls 619A, 619B, 619C, 619D, 621A, 621B, 621C, 621D of the reservoir 603. The reinforcement structure can be adhered to two opposite side walls 619A, 619B of the upper portion 605 of the reservoir 603, while allowing two other opposite side walls 619C, 619D to flex with respect to the reinforcement structure. Also, two opposite side walls 621A, 621B of the bottom portion 607 can be adhered to the reinforcement structure while two other bottom walls 621C, 621D are allowed to flex. For example, the adhered side walls 619A, 619B, 621A, 621B can be adhered to the reinforcement structure along most of their surface area. For example, the flexing side walls 619C, 619D, 621C, 621D are not adhered at all or only at points or small surface areas. In fact, in the illustrated example the flex walls 619C, 619D, 621C, 621D are provided with rivets 622 to connect to the reinforcement structure 623 to allow certain portions of the flex walls 619C, 619D, 621C, 621D to remain fixed and other portions to flex, for example in a way that enhances turbulence or powder flow towards the collection area at the bottom 609. In the illustrated example, the flexible top wall 615 is supported by a separate support structure 623B. The support structure 623B is planar. The support structure supports the opening connectors 695A, 695B and thereby, the top wall 615. For example the support structure 623B may be in itself supported by, or part of, the reinforcement structure.

Figure 11:
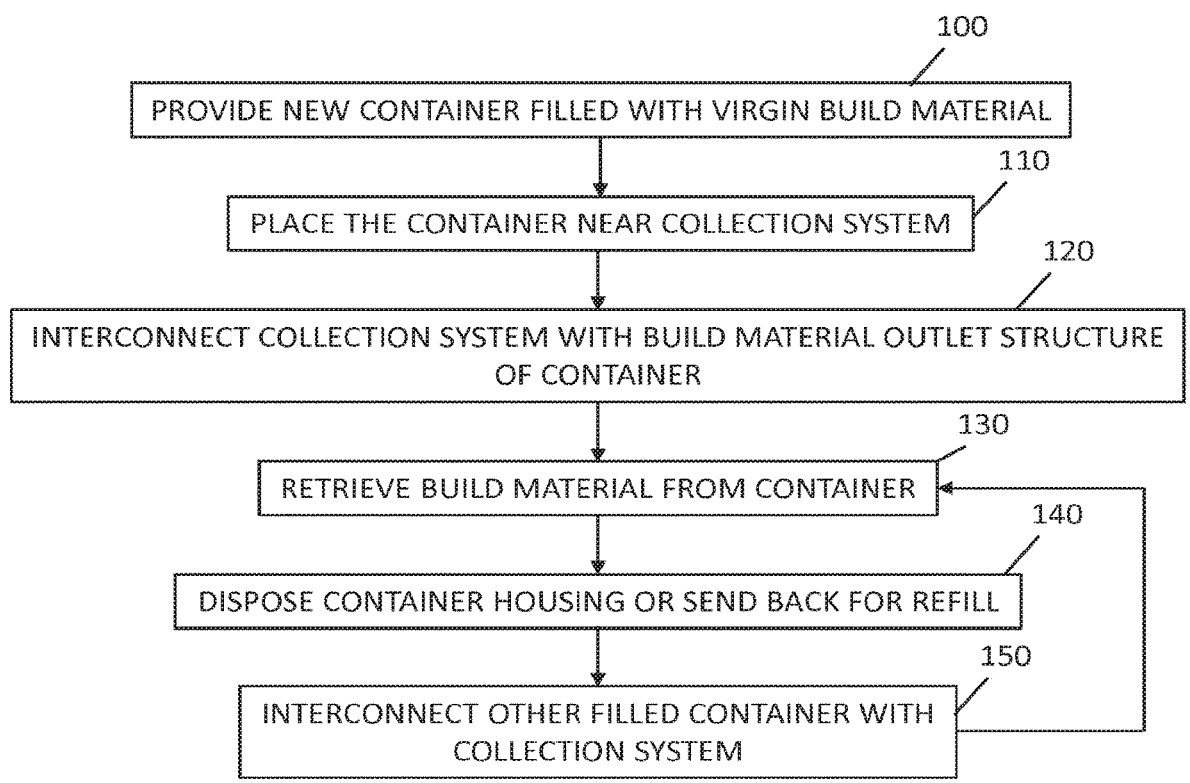
FIG. 11 illustrates a flow chart of an example of a method of using a build material container.

FIG. 11 illustrates an example of a method of using a build material container of this disclosure in conjunction with an external collection system. The collection system can be part of an additive manufacturing apparatus such as a build material recycling unit and/or 3D printer. The method includes providing a new container, for example filled with virgin build material (block 100). The method includes placing the container near a collection system (block 110). The collection system may include a pressure unit. The method includes interconnecting the collection system with a build material outlet structure of the container (block 120). The method includes retrieving the build material from the container (block 130), for example until the container is substantially empty. The method includes disposing the container as waste or transporting the empty container for recycling or refilling (block 140). The method includes interconnecting another, filled container with the collection system (block 150). The build material may be retrieved from the other container up to exhaustion, and also the other container may be disposed, recycled or refilled (blocks 130, 140). The cycle of blocks 130-150 can be repeated many times during the lifetime of an additive manufacturing apparatus. The container of this disclosure may enclose the build material during these multiple steps that may include an initial fill, transport, storage, and build material delivery to the additive manufacturing apparatus. Some of the example containers of this disclosure may facilitate collapsing of parts of the empty container for transport or storage.

Figure 12:
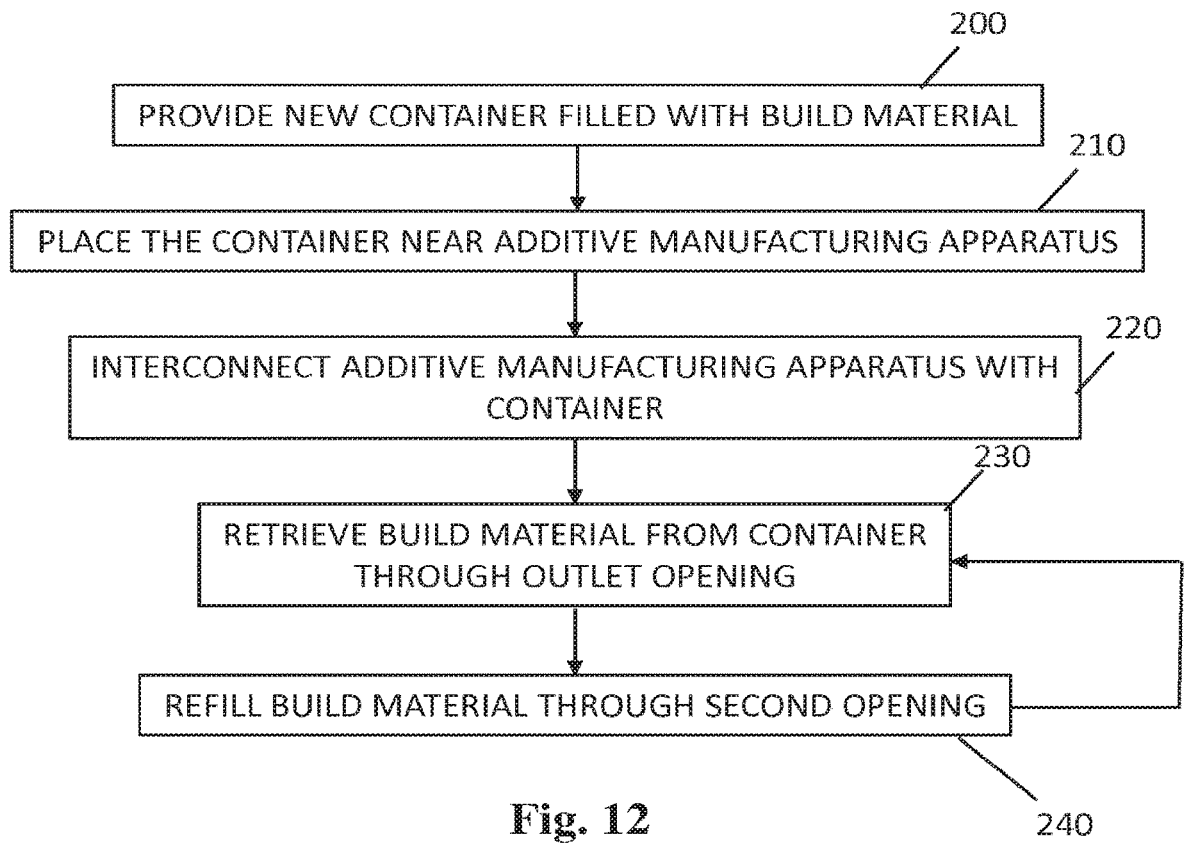
FIG. 12 illustrates a flow chart of another example of a method of using a build material container as a buffer.

FIG. 12 illustrates an example of a method of using a build material container of this disclosure as a buffer. The method may include providing a new container filled with build material (block 200). The method may include placing the container near an additive manufacturing apparatus (block 210). The additive manufacturing apparatus includes a recycler and a collection system. The collection system may include a pressure unit. The method includes interconnecting the additive manufacturing apparatus with the container (block 220). The method includes having the additive manufacturing apparatus retrieve the build material from the container through an outlet opening (block 230). For example, during such retrieving air may vent into the container through a second opening. The method may further include having the additive manufacturing apparatus refill the container through the second opening (block 240), for example while the additive manufacturing is mixing, recycling or printing on build material.

Figure 13:
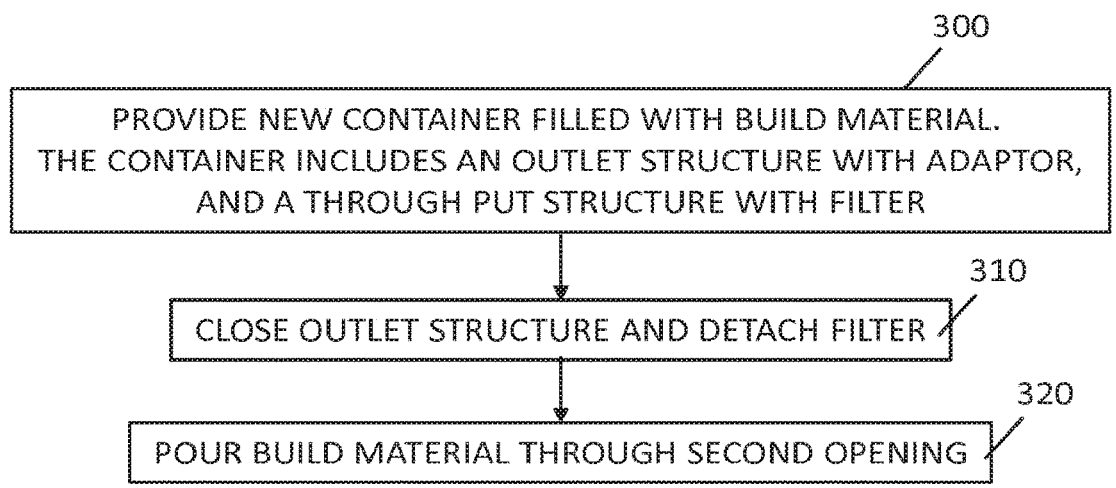
FIG. 13 illustrates a flow chart of an example of a method of manually pouring build material from a build material container.

FIG. 13 illustrates an example of a method of using a build material container of this disclosure. The container of this method may be any of the example containers, or may include any of the components, as explained with reference to any of the preceding FIGS. 3, 4-12. The method may include providing a new container filled with build material (block 300). The container includes an outlet structure with adaptor, to connect to a corresponding adaptor of a collection system, and a throughput structure with filter, for venting. The method includes detaching the filter and closing the outlet structure (block 310). For example detaching the filter opens the throughput structure to allow build material to flow through. The outlet structure can be closed by a lid. The method further includes manually pouring the build material through the second opening (block 320).

Figure 14:
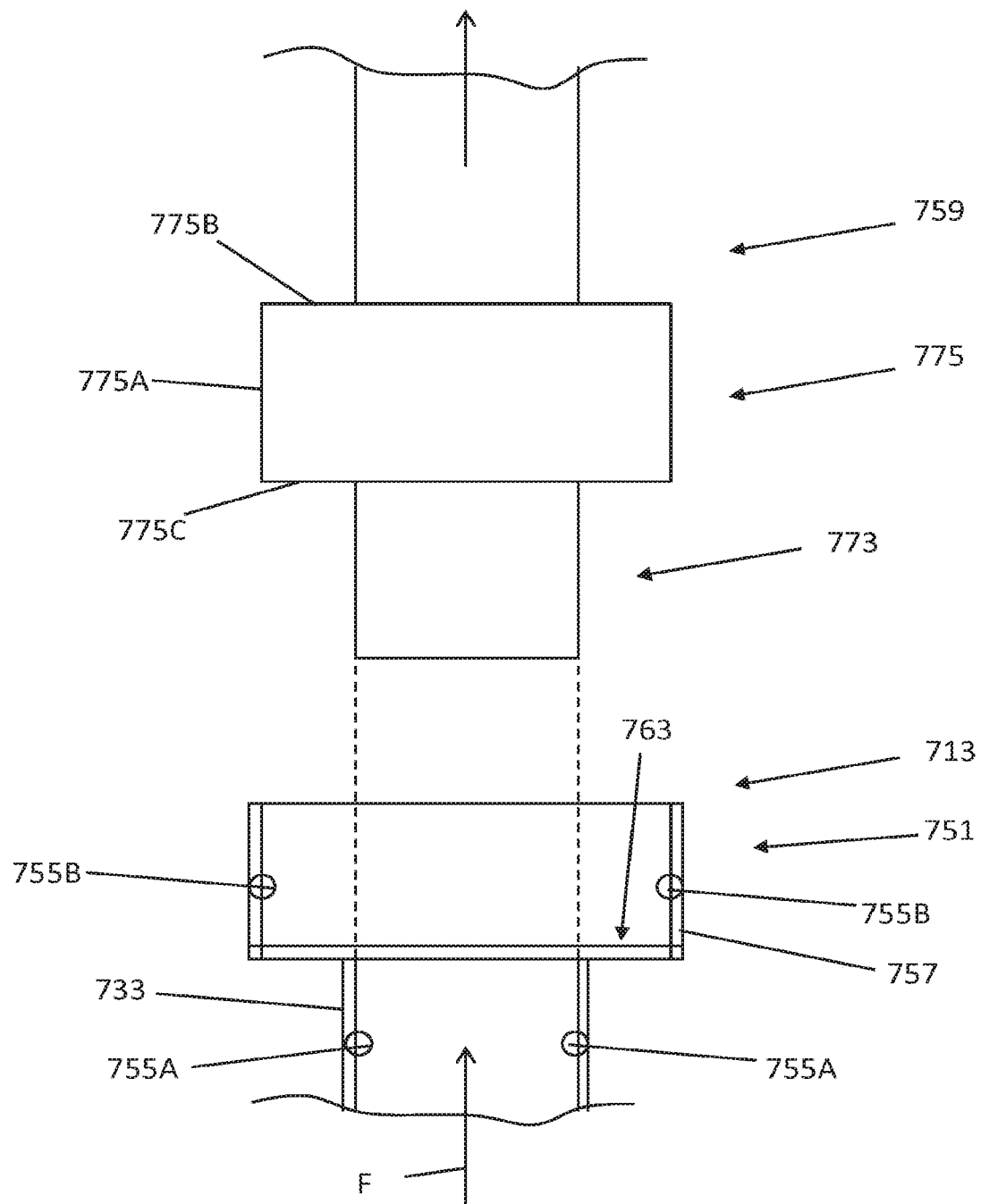
FIG. 14 illustrates a diagram of an example of an outlet structure and corresponding snout.

FIG. 14 illustrates a diagram of an example vacuum snout 773 of a collection system that is to be connected to an outlet structure 713, similar to FIGS. 6-8. The snout 773 extends from a second adaptor 775. The second adaptor 775 may have an outer wall 775A, for example a cylindrical outer wall 775A, and a top ridge 475B opposite to a second interface face 475C. The second interface face 475C is to connect to the outlet structure's interface face 763. The snout 773 and second adaptor 775 are part of a pressure unit 459 that is part of the collection system. The snout 773 is a tube shaped nozzle for insertion in the outlet structure 713.

The outlet structure 713 includes a first adaptor 751 having an outlet opening 731 in its center. The outlet structure may have at least one upright circumferential wall 457. An outlet tube 733 extends from the first adaptor 751 downwards. The opening 731 provides access to the outlet tube 733. The snout 773 is to be inserted in the outlet tube 733 to suck in build material and air. The snout 773 may fit, either relatively tightly or relatively loosely, to a circumferential inner wall of the outlet tube 733.

In one example at least one retention feature 755A is protrudes from the inner wall of the outlet tube 733, to engage and retain the snout 773 when inserted. In the illustrated example, the retention feature 755A may include a deformable structure that protrudes from the inner wall and is deformed when the snout 773 is pushed into the tube 733. The retention feature 755A may be integral to the tube. For example, the retention feature 755A is of the same plastic compound as the outlet tube 733. The retention feature 755A can be an annular ridge protruding from the inner wall of the outlet tube 733, orthogonal to the flow direction F. In other examples, at least one bump or rib, or series of bumps or ribs can be provided. In different examples the ribs may extend parallel or orthogonal to the flow direction F. The retention feature 755A may facilitate a friction fit between the outlet tube 733 and the snout 773 when the snout 773 is inserted. The retention feature 755A may also seal the outlet structure 713 in a connected condition, e.g., to inhibit floating build material dust from escaping.

In another example, the upright wall 757 of the adaptor 751 includes at least one retention feature 755B, similar to the above described retention feature 755A of the tube 733, that protrudes from the inner surface of the upright wall 757. The wall retention feature 755B can be provided in addition to, or instead of, the retention feature 755A of the tube 733, to engage the outer wall 775A of the second adaptor 775 and thereby also retain the snout in inserted condition. Similarly, such retention feature 755B can be an annular ridge protruding from the inner surface of the circumferential wall 757, orthogonal to the flow direction F. In other examples, at least one bump or rib, or series of bumps or ribs can be provided. In different examples the ribs may extend parallel or orthogonal to the flow direction F.

Figure 15:
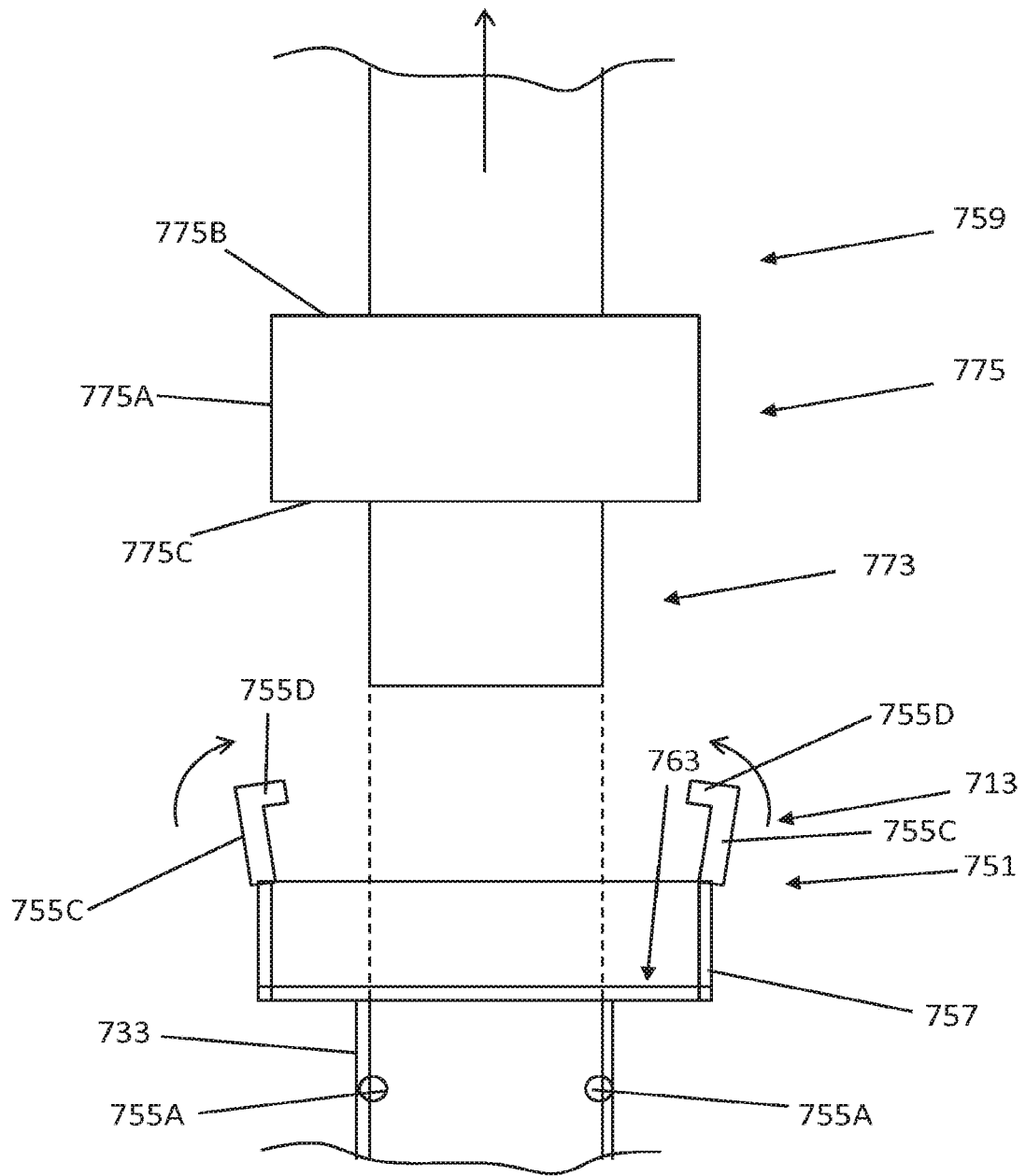
FIG. 15 illustrates a diagram of another example of an outlet structure and corresponding snout.

In FIG. 15, another example of a retention feature 755C is illustrated, that is part of the outlet structure 733. In this example, the retention features 755C may comprise a latch. For example the retention feature 755C can be part of, or connected to, the upright wall 757. For example, the retention feature 755C is to hinge outward to allow the second adaptor 775 and snout 773 to connect to the outlet structure 713, and inward to latch onto the top ridge 775B of the adaptor 775. The retention feature 755C may include a hook 755D or the like to engage the top ridge 775B of the second adaptor 775. For example the hook 755D can be removed from the top ridge 775B manually, by force, to release the snout 773 from the outlet structure 713.

The retention feature 755C can be an integral part of the upright wall 757 or adaptor 751, hinging about a live hinge. In another example the retention feature 775C can be a separate hinging part, for example hinging about a metal pin. In one example, at least three hinging retention features 755C are provided, evenly distributed around the adaptor 751, to hook upon the top ridge 775B. In an example, the retention feature 755C is attached to the interface face 763. In another example, the retention feature 755C is attached to the upright wall 757, or can form (part of) the upright wall 757. The dimensions of the retention feature 755C can be adapted to the height of the second adaptor wall 775A.

The example retention features 755A, 755B, 755C of FIGS. 15 and 15 can be applied to the outlet structure 413 of FIGS. 6-8, for example instead of or in addition to the magnetic guide features 455.

A reservoir portion of the container of this disclosure may have a generally cubical shape over most of its height and an upside-down pyramidal shape near the bottom. The cubical portion has substantially non-converging, e.g. approximately upright, walls. The cubical and pyramidal shape have rectangular cross sections, which may facilitate efficient storage and transport, as compared to, for example, round cross sections such as cylinder or coned shapes.

The non-converging upper portion and converging lower portion can be part of an integral, flexible, bag-like reservoir. The converging bottom allows for most of the build material to drop towards a collection area at the bottom by gravity. The non-converging upper portion facilitates storing relatively large volumes of build material within the contours of the container.

In one example the reservoir is at least partly flexible. Portions of the flexible walls of the reservoir may flex and/or vibrate when positive or negative pressure is applied, thereby preventing that portions of build material remain behind in the reservoir and assisting in flow of the build material. In certain scenarios some of the build material may release itself from certain pockets or corners formed in the flexible walls by vibration or flexing of the walls. Thereby most or all of the build material can be retrieved from the reservoir.

In certain examples, a lower portion of the reservoir does not need to have a funneled shape. For example, the side walls of the reservoir may be upright from top to bottom. For example the side walls may be substantially rectangular. Such container may efficiently store build material within the contours of the container. A disadvantage can be that it may be more difficult, as compared to funneled reservoirs, to extract all or most of the build material from the bottom. In such container, certain measures may be provided to counter such potential disadvantage, for example the outlet tube that extends up to the bottom, inside the reservoir can be made flexible or curved at the end, or adapted in another manner, to be able to reach build material near bottom edges of a bottom of the reservoir. In another example, the bottom can be made flexible to vibrate or flex under vacuum pressure, in such a manner that the build material drops or moves toward a center bottom collection area, for example as illustrated in FIG. 3. Again referring to FIG. 3, a longitudinal outlet tube 117 may engage the bottom at the center whereby the bottom around the center may lift under vacuum pressure and the outlet tube 117 retains the center bottom, and whereby the build material may move towards the inlet of the suction openings of the outlet tube.

In one example, the container is suitable for transport, additive manufacturing apparatus interconnection, build material retrieval, replacement, and disposal. In one example, for disposal purposes, the reinforcement structure includes cardboard or other bio-degradable material. Other bio-degradable material can include other cellulose fiber based material, starch, etc. The flexible reservoir can be made of a relatively degradable plastics, such as certain polyethylene films. In another example the flexible reservoir can include at least one bio-degradable layer such as coated, compressed cellulose based materials. Special coatings may provide for an air/vapor barrier.

In one example the reservoir can be partly relatively flexible and partly reinforced, for example by having varying materials and/or wall thicknesses. In such example the reinforcement structure can be integral to the reservoir, rather than separate and attached to the reservoir. The reservoir can have flexible and rigid wall portions. For example the reservoir includes, integrally, (i) flexible reservoir walls or flexible portions of reservoir walls and (ii) reinforced reservoir walls or portions of reservoir walls.

Such reservoir could have fold lines along reinforced wall portions to facilitate folding reinforced wall portions.

In one example, a container of this disclosure can be an assembly of separate parts. To that end, a kit of separate parts can be provided, to form a container of this disclosure. The kit may include a reservoir, a reinforcement structure, an outlet structure and a throughput structure. The reservoir may have precut openings to connect the outlet structure and throughput structure. Separate sub-components of the outlet structure may include an adaptor, digital memory circuitry, magnetic elements, a longitudinal tube, and a tube end portion with lateral holes. Also, screws and adhesive may be used. In addition an additional outer structure carrying a graphics design of the container may be provided. Separate seal films may cover the outlet structure and throughput structure until opened for usage of the container.

In one example, a pressure unit of an additive manufacturing apparatus, to be connected to a container of this disclosure, has an air speed of at least 10 liters per seconds or at least 15 liters per second, for example 20 to 30 liters per second. Such pressure unit may connect to a container having a reservoir volume of between approximately 5 and 60 liters. In one example, the flexible reservoir wall material is to flex or vibrate when air circulates into the container though the throughput opening and out of the container through the outlet opening.

The containers of this disclosure may be arranged to provide build material to additive manufacturing apparatuses for additive manufacturing. In certain examples the additive manufacturing apparatus is directly connectable to the container to collect the powder from the container and add it to the additive manufacturing process. The additive manufacturing apparatus can be a recycler and/or a 3D printer that includes a pressure unit. In another example, separate, specialized build material pressure unit can be used to transport build material from the container to the additive manufacturing apparatus.

In one example, the container is to store approximately 5-60 liters of build material, for example approximately 10-50 liters or approximately 15-40 liters. These volumes and associated weights, that depend on the type of build material, may allow for an operator to readily handle the container, for example to manually lift, stack and move the container, for transport, storage and additive manufacturing. In addition the container can be readily connected to an additive manufacturing apparatus by an easy, quick and relatively clean interconnection action, for collecting the build material. The container can be replaced by a new container when empty, allowing for easy disposal or collapsing in a substantially empty condition. During most of the process steps escaping build material powder may be inhibited.

In one example the container is a source supply of virgin build material. In another example the container is a source supply of recycled or partly recycled build material. In yet another example the container may be used, at least temporarily, as a buffer supply.

This disclosure refers to "upright", "lower", "upper", "top", "bottom", "side", etc. These descriptive terms were chosen for readability of the application. However, these descriptive terms should not limit the container to having only a single orientation. These descriptive terms may refer to a condition wherein the container is connected to the collection system and uses gravity to allow the build material to flow or drop to the bottom. However, similar structures as described in this disclosure, may have any orientation. In one example, "bottom" may be understood as a gravitationally lower side of the container in installed condition, e.g., where build material is to be collected from inside the reservoir, and the other descriptive terms can be interpreted as relative to that bottom. Also when the container is empty and not in use it may be readily derivable what is the proper usage orientation of the container. The container may have other orientations during, e.g., transport, storage, in a folded condition, in a (partly) disassembled condition, etc. or other non-usage condition, wherein the side that is the bottom of the container does not extend at the bottom, and, for example, a top portion of the container may in fact extend below or next to the bottom. Also there may be different install/usage orientations for different reasons. If we would use a reference system for the same container, "bottom" or "lower" could refer to a lower point on a y-axis, "upper" or "top" to a higher point on the same y-axis, "sides" to extremes on the x- or z-axis, and "upright" to a condition where the y-axis is a center axis of the container, wherein the reference system can have any orientation.

One aspect of this disclosure involves an additive manufacturing build material container (1, 1A, 1B, 101, 101B, 201, 501, 601), including (i) a reservoir (3, 3A,3B, 103, 103B, 203, 503, 603) to hold build material. The reservoir includes (i) an upper portion (5, 5A, 5B, 105, 105B, 205, 605) of more than half the height H of the reservoir, having at least one relatively non-converging side wall (19, 19A, 19B, 119, 119B, 219, 619A-D) and (ii) a lower portion (7, 7A, 7B, 107, 107B, 207, 607) between the upper portion and a bottom (9, 9A, 9B, 109, 109B, 209, 609), having converging side walls (21, 21A, 21B, 121A, 121B, 221, 621), at least in a filled state. The container further includes a build material outlet structure (13, 13A, 13B, 113, 113B, 213, 313, 413, 513, 613) to allow build material to exit the reservoir. For example, the upper portion is generally cubical shaped and the lower portion is generally pyramid shaped. The pyramid walls (21, 21A, 21B, 121A, 121B, 221, 621) may be truncated, or terminate in a round surface or along a line.

Another aspect of this disclosure involves a 3D printing build material container (1, 1A, 1B, 101, 101B, 201, 501, 601) comprising a relatively flexible reservoir (3, 3A,3B, 103, 103B, 203, 503, 603) including flexible material, a reinforcement structure (123, 123B, 223, 523) including relatively rigid material, more rigid than the flexible material, to support portions of the relatively flexible reservoir, and an outlet structure (13, 13A, 13B, 113, 113B, 213, 313, 413, 513, 613) providing access to the inside of the reservoir via an opening (231, 431, 631). The flexible walls may move or vibrate by pressure differences. In an example where the flexible reservoir walls (19, 19A, 19B, 119, 119B, 219, 619A-D, 21, 21A, 21B, 121A, 121AA, 121B, 221, 621)) are somewhat elastic, these walls may have a Young's modulus of approximately $1*10^9$ N/m$^2$ GPa or less. The reinforcement structure may retain certain portions of the reservoir while facilitating flexing of other non-attached portions of the reservoir, for example if a pressure is applied to the inside of the reservoir. For example substantially complete reservoir wall surfaces may be retained while other walls surfaces may be allowed to be completely or partly flexible, by selectively attaching the reinforcement structure. In one example, the reinforcement structure comprises a cardboard folded structure. In another example, the reinforcement structure can be a support frame like wireframe.

In an empty condition, the flexible reservoir can be collapsed. The reinforcement structure can be foldable. In certain examples a reservoir structure can be partly rigid and partly flexible. The reservoir has a relatively low air/vapor permeability while the reinforcement structure has a higher air/vapor permeability than the reservoir. For example, cardboard has a relatively high air/vapor permeability.

The outlet structure may include an outlet opening in a top portion of the reservoir. For example, the outlet opening can be provided through a top wall, or in a side wall near the top wall. Hence, build material can be retrieved from a top side of the container which may allow for placing the container on or near the ground during usage.

The outlet structure may include a first adaptor to readily connect to and disconnect from a corresponding second adaptor of an external collection system. The first adaptor including an interface face around the outlet opening, approximately perpendicular to an air or build material flow direction, wherein at least one guide feature and at least one further interface feature are provided in the interface face. An example of such guide feature is a magnetic feature to attract a corresponding magnetic feature of the collection system, wherein example interface features may include a data interface and a sensor trigger structure. Another example of the guide feature is a data interface slot (or protrusion), wherein the interface feature can be the magnetic feature or the sensor trigger structure. Further guidance for the collection system may be provided by an upright wall around the interface face and the tube.

The outlet structure may further include at least one retention feature to retain a connection with a pressure unit. The retention feature can be at least one of a magnetic feature, to connect to an opposite magnetic feature by magnetic attraction, a latch, a friction fit protrusion, etc.

The data interface is configured to communicate build material parameters to an opposite, second, data interface of the collection system, when connected to the collecting system. For example the data interface may include contact pads that are to communicate build material parameters to the collection system, as provided by a chip, integrated circuitry, memory units on the adaptor of the outlet structure.

The outlet structure may include a longitudinal collection unit to collect build material from the bottom and guide the build material to the outlet opening. In an example, the collection unit includes a tube, extending in the reservoir from a top portion up to near a bottom of the reservoir, between and past the non-converging walls, to collect the build material from a collection area in the bottom and guide the build material to the outlet opening. An end portion of the outlet tube may touch or nearly touch a bottom portion of the reservoir and has lateral openings. Herein, a bottom portion can be one of the converging walls or the bottom. The components of the outlet structure may be formed of a molded plastic compound, for example including conductive particles for earthing. The outlet structure may be separately detached, recycled and/or disposed with respect to the rest of the container.

In one example, the outlet tube includes both a build material outlet channel and a vent channel, extending parallel to each other from a top to near a bottom of the reservoir. The vent may vent near a collection area at the bottom of the reservoir. In another example, a vent structure may be provided in the lower, funneled portion of the reservoir, instead of, or in addition to, the vent in the outlet tube.

As illustrated in FIG. 8, the outlet structure may include an inner valve to (i) inhibit build material particles from exiting when the outlet structure is disconnected from the collection system, and (ii) open when a snout of the collection system connects to the outlet structure. In one example, this is achieved by an at least partially hinging or bending valve. In other example, a spring-biased valve may be used that opens when the snout is pressed into the adaptor. The valve may allow for repetitive connection of a pressure unit snout when disconnecting the snout. In yet another example, a single use removable or breakable film or seal can be used, instead of, or in addition to, the valve that can be broken or removed before or during connection to the snout.

The container may further include an air/build material throughput structure next to the outlet structure to facilitate venting. In an example, the throughput structure extends in a top wall to facilitate venting above a build material top surface in the reservoir. The throughput structure may extend between the build material outlet structure and a side of the container, at a distance from the build material outlet structure, and includes a filter to obstruct build material. The throughput structure may be attached to the container over a second opening in a detachable manner to facilitate detaching the filter and manually pouring out the build material, for example as an alternative to coupling the container to an automatic, pressurized collection system. This may facilitate users without a specific collection system or recycling system to use/reuse the container. Furthermore, detaching the outlet structure and throughput structure from the container may facilitate collapsing for transport or storage purposes.

What is claimed is:

1. An additive manufacturing build material container comprising
    a reservoir to hold build material including
        an upper portion of more than half a height of the reservoir,
        a lower portion between the upper portion and a bottom, having converging side walls, at least in a filled state; and
    a build material outlet structure to allow build material to exit the reservoir;
    wherein the upper portion has a cube shape and the lower portion has a pyramid shape.

2. The container of claim 1, wherein:
    the outlet structure includes a collection unit to collect build material from a bottom of the outlet structure and guide the build material to an outlet opening of the outlet structure; and
    the collection unit includes a tube with an end portion of the tube abutting or adjacent to a bottom portion of the reservoir and the end portion of the tube having lateral openings.

3. The container of claim 1, wherein the outlet structure includes an adaptor to connect to and disconnect from an external collection system, the adaptor including an interface face around an outlet opening, wherein at least one guide feature is provided on the interface face.

4. The container of claim 3, wherein the outlet structure includes a sensor trigger structure that protrudes from a face of the outlet structure to trigger a sensor of the external collection system.

5. The container of claim 1, wherein the outlet structure includes a longitudinal collection unit to collect build material from a bottom of the reservoir and guide the build material to an outlet opening of the outlet structure.

6. An additive manufacturing build material container comprising
    a reservoir to hold build material including
        an upper portion of more than half a height of the reservoir,
        a lower portion between the upper portion and a bottom, having converging side walls, at least in a filled state; and a build material outlet structure to allow build material to exit the reservoir;

wherein:

the outlet structure includes a collection unit to collect build material from a bottom of the outlet structure and guide the build material to an outlet opening of the outlet structure; and the collection unit includes a tube with an end portion of the tube abutting or adjacent to a bottom portion of the reservoir and the end portion of the tube having lateral openings.

7. The container of claim 6, wherein the tube includes a build material outlet channel and a vent channel, extending parallel to each other from a top portion to a bottom of the tube.

8. The container of claim 6, wherein the reservoir walls have a Young's modulus of $1*10^9$ N/m² GPa or less.

9. The container of claim 6, wherein the reservoir walls are flexible, the container further comprising a reinforcement structure to resist flexing of certain wall portions of the reservoir.

10. The container of claim 9, wherein the reinforcement structure is attached to certain portions of the reservoir while facilitating flexing of other non-attached portions if a pressure is applied inside of the reservoir.

11. The container of claim 6, wherein the reservoir has a relatively low air/vapor permeability while the reinforcement structure has a higher air/vapor permeability than the reservoir.

12. An additive manufacturing build material container comprising a reservoir to hold build material including an upper portion of more than half a height of the reservoir, a lower portion between the upper portion and a bottom, having converging side walls, at least in a filled state; and a build material outlet structure to allow build material to exit the reservoir;

wherein the outlet structure includes an inner valve that inhibits build material particles from exiting when the outlet structure is disconnected from a collection system, and opens when a snout of the collection system connects to the outlet structure.

13. The container of claim 12, comprising an air/build material throughput structure next to the outlet structure to facilitate venting.

14. The container of claim 13, wherein the throughput structure extends, in a top portion, between the build material outlet structure and a side of the container and at a distance from the build material outlet structure.

15. The container of claim 14, wherein the throughput structure comprises a removable filter structure.

16. The container of claim 12, wherein:

the outlet structure includes a collection unit to collect build material from a bottom of the outlet structure and guide the build material to an outlet opening of the outlet structure; and the collection unit includes a tube with an end portion of the tube abutting or adjacent to a bottom portion of the reservoir and the end portion of the tube having lateral openings.

17. The container of claim 12, wherein the outlet structure includes an adaptor to connect to and disconnect from the collection system, the adaptor including an interface face around an outlet opening, wherein at least one guide feature is provided on the interface face.

18. A 3D printing build material container comprising a relatively flexible reservoir including flexible material, a reinforcement structure including relatively rigid material, more rigid than the flexible material, to support portions of the relatively flexible reservoir, an outlet structure providing access to the inside of the reservoir via a first opening in the reservoir; and a throughput structure over a second opening in the flexible reservoir that is distanced from the first opening; wherein the outlet structure is a build material outlet and the throughput structure is a vent.

19. The container of claim 18, wherein:

the throughput structure includes a filter over the second opening to obstruct build material while allowing air to pass.

20. The container of claim 18, wherein the flexible reservoir includes a plastic bag, and the reinforcement structure includes a foldable structure at least partially around the bag to support portions of reservoir walls, and an outer cardboard shell.

* * * * *